United States Patent
Suzuki et al.

(10) Patent No.: US 8,577,942 B2
(45) Date of Patent: Nov. 5, 2013

(54) ELECTRONIC DEVICE AND DATA PROCESSING DEVICE FOR IMPLEMENTING CRYPTOGRAPHIC ALGORITHMS

(75) Inventors: Daisuke Suzuki, Tokyo (JP); Minoru Saeki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1614 days.

(21) Appl. No.: 11/629,358

(22) PCT Filed: Jul. 7, 2004

(86) PCT No.: PCT/JP2004/009633
§ 371 (c)(1),
(2), (4) Date: Dec. 12, 2006

(87) PCT Pub. No.: WO2006/006199
PCT Pub. Date: Jan. 19, 2006

(65) Prior Publication Data
US 2008/0021940 A1    Jan. 24, 2008

(51) Int. Cl.
*G06F 1/02* (2006.01)

(52) U.S. Cl.
USPC ........................................................ 708/250

(58) Field of Classification Search
USPC ........................................................ 708/250
See application file for complete search history.

(56) References Cited

U.S. PATENT DOCUMENTS

| | | | |
|---|---|---|---|
| 5,808,486 A * | 9/1998 | Smiley | 327/34 |
| 6,278,783 B1 | 8/2001 | Kocher et al. | |
| 6,498,404 B1 | 12/2002 | Thuringer et al. | |
| 6,510,518 B1 | 1/2003 | Jaffe et al. | |
| 6,820,814 B1 | 11/2004 | Benoit | |
| 6,940,975 B1 | 9/2005 | Kawamura et al. | |
| 7,471,791 B1 | 12/2008 | Coron et al. | |
| 2003/0048903 A1 | 3/2003 | Ito et al. | |
| 2003/0120941 A1* | 6/2003 | Bae | 713/193 |
| 2004/0028224 A1 | 2/2004 | Liardet et al. | |
| 2005/0036618 A1* | 2/2005 | Gammel et al. | 380/255 |

FOREIGN PATENT DOCUMENTS

| | | |
|---|---|---|
| EP | 1 351 148 A2 | 10/2003 |
| FR | 2789776 A1 | 8/2000 |
| JP | 2000-66585 A | 3/2000 |
| JP | 2002-311826 A | 10/2002 |

(Continued)

OTHER PUBLICATIONS

Author: Wikipedia; Title: "Transistor"; Date: Jul. 5, 2004; URL: http://en.wikipedia.org/w/index.php?title=Transistor&oldid=4653316.*

(Continued)

*Primary Examiner* — Chuong D Ngo
(74) *Attorney, Agent, or Firm* — Birch, Stewart, Kolasch & Birch, LLP.

(57) ABSTRACT

An electronic device that defends against an attack trying to identify confidential information from power consumption is provided without any circuit that performs a complementary operation to eliminate bias in power consumption. An elementary device A 100 is formed by a plurality of transistors 101-112. The elementary device A 100 receives inputs signals $x_1$, $x_2$, a random number r, and a control signal en, and outputs z. The output z is obtained by XORing $(x_1\hat{\ }r)\&(x_2\hat{\ }r)$ with the random number r. After the state transitions of the input signal, $x_1$, $x_2$, and the random number r, are settled, the control signal en is used to output z. This makes the signal transition rate of the output z equal, thereby defending against an attack trying to identify confidential information from power consumption.

3 Claims, 24 Drawing Sheets

(56) References Cited

FOREIGN PATENT DOCUMENTS

| | | |
|---|---|---|
| JP | 2002-539488 | 11/2002 |
| JP | 2002-539488 A | 11/2002 |
| JP | 2002-540654 A | 11/2002 |
| JP | 2002-366029 A | 12/2002 |
| JP | 2003-526134 A | 9/2003 |
| JP | 2003-345472 A | 12/2003 |
| WO | WO-00/49765 A2 | 8/2000 |
| WO | WO-00/49765 A3 | 8/2000 |

OTHER PUBLICATIONS

Author: Cong; Title: "Combinational Logic Synthesis for LUT Based Field Programmable Gate Arrays"; Date: Apr. 1996; URL: http://portal.acm.org/citation.cfm?id=233539.233540.*

Messerges, T.S., "Securing the AES Finalists Against Power Analysis Attacks," Fast Software Encryption, international Workshop, vol. 1978, pp. 150-164, XP-001040960, Apr. 1, 2000.

* cited by examiner

Fig. 7

| $X_1$ <br> ($x_1 = x_i \char"5E r$) | $X_2$ <br> ($x_2 = x_j \char"5E r$) | r | Z |
|:---:|:---:|:---:|:---:|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

| $x_i$ | $x_j$ | z |
|---|---|---|
| 0 | 0 | 0 |
| 0 | 1 | 0 |
| 1 | 0 | 0 |
| 1 | 1 | 1 |

$P^0 = 3/4$, $P^1 = 1/4$ $P^{01} = P^{10} = P^0 \times P^1 = 3/16$ $\alpha = P^{01} + P^{10} = 3/8$ $\alpha_{(x_i=0)} = P^0 \times P^1_{(x_i=0)} + P^1 \times P^0_{(x_i=0)}$
$= 1/4$ $\alpha_{(x_i=1)} = P^0 \times P^1_{(x_i=1)} + P^1 \times P^0_{(x_i=1)}$
$= 1/2$

Fig. 9A

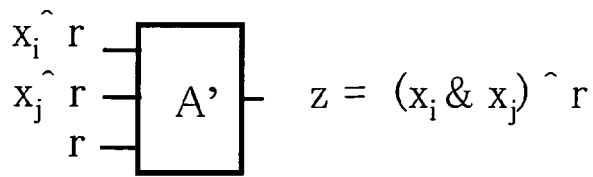

$z = (x_i \& x_j) \hat{} \, r$

Fig. 9B

| $x_i$ | $x_j$ | $r$ | $z$ |
|---|---|---|---|
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 0 |

Fig. 9C $\alpha \; (x_i=0) = P^0 \times P^1 (x_i=0) + P^1 \times P^0 (x_i=0)$
$= 1/2$ $\alpha \; (x_i=1) = P^0 \times P^1 (x_i=1) + P^1 \times P^0 (x_i=1)$
$= 1/2$ CHANGE FROM $x_i{}'$, $x_j{}'$, $r'$ TO $x_i$, $x_j$, $r$

[CHANGING ORDER] $x_i \rightarrow x_j \rightarrow r$ $z = (x_i{}' \& x_j{}') \hat{} \, r'$
↓
$z = (x_i \& x_j{}') \hat{} \, r'$
↓
$z = (x_i \& x_j) \hat{} \, r'$
↓
$z = (x_i \& x_j) \hat{} \, r$

CHANGE INDEPENDENT OF RANDOM NUMBER

Fig. 10A
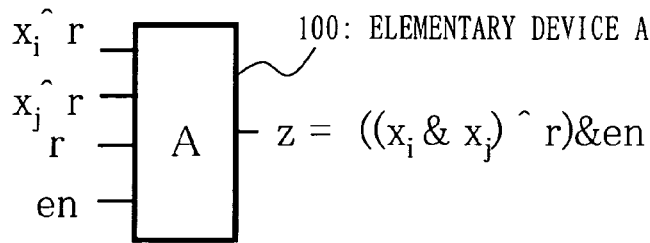
100: ELEMENTARY DEVICE A
$z = ((x_i \& x_j) \char`\^ r) \& en$
Fig. 10B
| $x_i$ | $x_j$ | r | z |
|---|---|---|---|
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 0 |
Fig. 10C
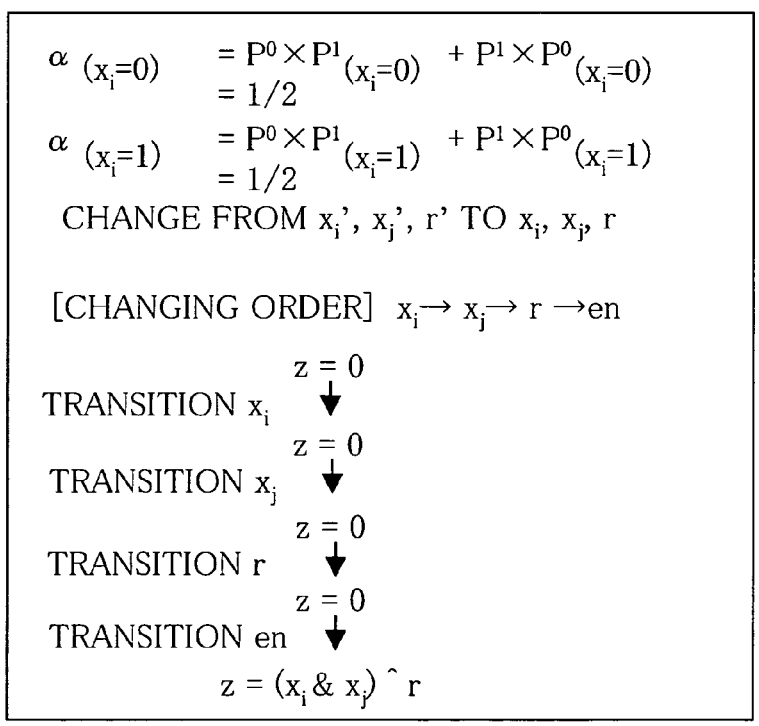

$Z = ( (X_1 \hat{} r) \& (X_2 \hat{} r) \hat{} r) \& en$

|  | | {x₄,x₃,x₂,x₁} | | | | | | | | | | | | | | |
|---|---|---|---|---|---|---|---|---|---|---|---|---|---|---|---|---|
|  | | 0 | 1 | 2 | 3 | 4 | 5 | 6 | 7 | 8 | 9 | 10 | 11 | 12 | 13 | 14 | 15 |
| {x₅,x₀} | 0 | 14 | 4 | 13 | 1 | 2 | 15 | 11 | 8 | 3 | 10 | 6 | 12 | 5 | 9 | 0 | 7 |
|  | 1 | 0 | 15 | 7 | 4 | 14 | 2 | 13 | 1 | 10 | 6 | 12 | 11 | 9 | 5 | 3 | 8 |
|  | 2 | 4 | 1 | 14 | 8 | 13 | 6 | 2 | 11 | 15 | 12 | 9 | 7 | 3 | 10 | 5 | 0 |
|  | 3 | 15 | 12 | 8 | 2 | 4 | 9 | 1 | 7 | 5 | 11 | 3 | 14 | 10 | 0 | 6 | 13 |

TABLE S1

$\{x_5, x_4, x_3, x_2, x_1, x_0\} = \{011011\}, \quad \{y_3, y_2, y_1, y_0\} = 5 = \{0101\}$ EXAMPLE OF ELEMENTARY DEVICE A
OR TYPE
$z = ((x_1 \hat{\ } r) | (x_2 \hat{\ } r) \hat{\ } r) \& en$ EXAMPLE OF ELEMENTARY DEVICE A
2-INPUT NAND TYPE
$z = (\sim((x_1 \char`\^ r) \& (x_2 \char`\^ r)) \char`\^ r ) \& en$ EXAMPLE OF ELEMENTARY DEVICE B
2-INPUT XOR TYPE
z = ( (x_1 ^ r) ^ (x_2 ^ r) ^ r ) & en

AND-XOR CIRCUIT
(BEFORE COUNTERMEASURES ARE TAKEN)

AND-XOR CIRCUIT
(AFTER COUNTERMEASURES WERE TAKEN)

ELECTRONIC DEVICE AND DATA PROCESSING DEVICE FOR IMPLEMENTING CRYPTOGRAPHIC ALGORITHMS

TECHNICAL FIELD

The present invention relates to an electronic device that forms a semiconductor for implementing cryptographic algorithms. For example, this invention relates to an electronic device and a data processing method that defend against an attack trying to identify confidential information processed within a device based on the power consumption of the device.

BACKGROUND ART

Conventional countermeasures for protecting confidential information on semiconductor devices are divided roughly into two types: software based countermeasures using a specific semiconductor device, which is typified by Central Processing Unit (CPU), and hardware based countermeasures on the semiconductor device itself.

The software based countermeasures of the former case are implemented by a device formed by both a CPU and a memory in itself, which is typified by an IC card. JP2000066585, for example, describes as follows: a widely used common key block encryption, DES (Data Encryption Standard), uses a conversion table called S-box, which is used in the algorithms thereof. The algorithms are computed by using a random parameter R based on a predetermined rule X, in advance to obtain a plurality of conversion tables that are different from the S-box prescribed by the algorithms. Then, a result thereof is stored in a memory. When the algorithms are processed, the plaintext data M (or the ciphertext data C) is processed by using the key data K and the random number parameter R to obtain the ciphertext data C (plaintext data M). This makes the processing flow vary because of R as much as the number thereof, which is different from the conventional process of M(C) using K only, thereby resulting in diversity of power consumption. Furthermore, the use of the random number parameter R makes intermediate values in the process unpredictable, and it is therefore impossible to decipher confidential information from power consumption. As another example, JP2002540654T discloses similar countermeasures. This art discloses a different method in setting the rule X and the random number parameter R from that of the previous one. Substantially, however, they show equivalent countermeasures.

The hardware based countermeasures of the latter case are implemented by a design method for implementing algorithms by a semiconductor device. For example, JP2003526134T describes as follows; countermeasures are taken by implementing a pair of an AND gate as an elementary device of a digital circuit and an INV-AND gate, which has a switching characteristic complementary to (offsetting) that of the AND gate (which will be referred to hereinafter as a gate pair). Therefore the intermediate value of algorithm does not dependent on power consumption. This makes it impossible to decipher confidential information from power consumption. JP2002311826 discloses analogous countermeasures as follows: a pair is formed not on a gate basis but on a circuit basis (a circuit for implementing the S-box in this specific case). Apparently this is different from the countermeasures of JP2003526134T, but substantially they are the same.

In principle, with those conventional gate-pair based countermeasures, confidential information may be deciphered for the following reason.

The security of the gate pair is based on a fully complementary operation performed by the AND gate and the INV-AND gate. To meet this condition, it is required that the pair of the AND gate and the INV-AND gate operate with the same timing and also that loads connected to the gates are the same. This is because a tiny gap in operation timing will also cause a time difference in power consumption to be measured, so that power resulting from the gates will be measured with a phase difference. If the gate loads of the AND gate and the INV-AND gate of a gate pair are different from each other, then the power consumptions of the two gates measured immediately after their operations are also different. This easily shows which gate operated. This does not provide a complementary operation. A gate added to provide a complimentary operation (which will be referred to hereinafter as a dummy gate) is a redundant gate in terms of logical implementation, and therefore an output from the gate is not used. Therefore, the dummy gate tends to have load smaller than that of a necessary gate. In order to have load equalization, a pair may be formed by whole circuits instead of gates, which is exemplified by the countermeasures described in JP2002311826. It is however very difficult to guarantee that a corresponding gate pair will operate with the same timing. The problems posed here result from the fact that there are two output nodes in order to allow a gate pair or a circuit pair to perform a complementary operation.

Patent Document 1: JP2000066585
Patent Document 2: JP2002540654T
Patent Document 3: JP2003526134T
Patent Document 4: JP2002311826

DISCLOSURE OF THE INVENTION

Problem to be Solved by the Invention

It is an object of the present invention to solve the problem of time difference and the problem of load balancing by providing a semiconductor device configured to perform a complementary operation in principle with a single output node.

Means to Solve the Problems

An electronic device according to this invention may be characterized in that the electronic device may receive as an input signal a result of an XOR operation of predetermined data with a first random number, perform a predetermined logic operation based on the input signal received, perform an XOR operation of a result of the logic operation with a second random number, and output a result of the XOR operation of the result of the logic operation with the second random number as an output signal.

An electronic device according to this invention may be characterized in that the electronic device may receive XOR data indicating data obtained by XORing data of n bits (n≥1) with a first random number of n bits, the first random number of n bits, and a second random number of 1 bit as input signals, perform an XOR operation of the XOR data with the first random number to obtain the data of n bits, perform a predetermined logic operation using each bit of the data of n bits obtained, perform an XOR operation of a result of the logic operation with the second random number, and output as an output signal a result of the XOR operation of the result of the logic operation with the second random number.

The first random number may be characterized by being an n-bit random number, each bit having a same value, and the second random number may be characterized by being the same value as that of the each bit of the first random number.

The electronic device may be characterized by being independent of the state transitions of the input signals, and outputting the output signal without performing transitional processes.

The electronic device may be characterized by further receiving a command signal that instructs the electronic device to output the output signal, and outputting the output signal upon receipt of the command signal.

The predetermined logic operation may be characterized by being selected from among a logical multiply (AND) operation, a negative AND (NAND) operation, a logical add (OR) operation, a negative OR (NOR) operation, and an exclusive-OR (XOR) operation.

An electronic device according to this invention may be characterized by being formed by a plurality of transistors. The electronic device may also be characterized by receiving a first random number, a second random number, and n-bit data (n≥1), and outputting a predetermined signal as an output signal. The electronic device may also be characterized by outputting by switching of the plurality of transistors the output signal indicating an equivalent result of a result obtained by processes of an XOR operation of the first random number with the n-bit data upon receipt of the first random number, the second random number, and the n-bit data, a predetermined logic operation using each bit indicating a result of the XOR operation, and an XOR operation of a result of the predetermined logic operation with the second random number.

The first random number may be characterized by being an n-bit random number, each bit having a same value, and the second random number may be characterized by being a 1-bit random number having the same value as that of the each bit of the first random number.

The electronic device may be characterized in that the plurality of transistors may perform simultaneous switching.

The electronic device may be characterized by receiving a command signal that instructs the elementary device to output the output signal, and outputting the output signal upon receipt of the command signal.

An electronic device according to this invention may be characterized by receiving a first random number, a second random number, and n-bit data (n≥1), and outputting a predetermined signal as an output signal. The electronic device may also be characterized by including a receiving portion that may receive the first random number, the second random number, and the n-bit data; a storing portion that may store logic data formed by 0 and 1; and a plurality of transistors. Each of the plurality of transistors may retrieve, when the receiving portion receives the first random number, the second random number and the n-bit data, by switching from the logic data stored in the storing portion an equivalent result to a result obtained by processes of an XOR operation of the first random number with the n-bit data, then a predetermined logic operation using each bit indicating a result of the XOR operation, and then an XOR operation of a result of the predetermined logic operation with the second random number, and outputting the equivalent result as the output signal.

The first random number may be characterized by being an n-bit random number, each bit having a same value, and the second random number may be characterized by being a 1-bit random number having the same value as that of the each bit of the first random number.

The plurality of transistors may be characterized by performing simultaneous switching.

The receiving portion may be characterized by further receiving a command signal that instructs the electronic device to output the output signal. The electronic device may be characterized by outputting the output signal upon receipt of the command signal.

A data processing method according to this invention may be characterized by including: receiving as an input signal a result of an XOR operation of predetermined data with a first random number; performing a predetermined logic operation based on the input signal received; performing an XOR operation of a result of the logic operation with a second random number; and outputting as an output signal a result of the XOR operation of the result of the logic operation with the second random number.

A data processing method according to this invention may be characterized by including: receiving as input signals XOR data indicating data obtained by XORing data of n bits with a first random number of n bits, the first random number of n bits, and a second random number of 1 bit; performing an XOR operation of the XOR data with the first random number to obtain the data of n bits; performing a predetermined logic operation using each bit of the data of n bits obtained; performing an XOR operation of a result of the logic operation with the second random number; and outputting as an output signal a result of the XOR operation of the result of the logic operation with the second random number.

Effect of the Invention

This invention may be used to defend against an attack trying to identify confidential information by power consumption without having a circuit performing a complementary operation.

BRIEF DESCRIPTION OF THE DRAWINGS

FIG. 7 It shows a truth table of the elementary device A 100 according to the first embodiment.

FIG. 9A It shows a 2-input AND gate.

FIG. 9B It shows a truth table of the 2-input AND gate.

FIG. 9C It is a diagram illustrating transient transition in relation to the signal transition rate of the 2-input AND gate.

FIG. 10A It shows inputs to and an output from the elementary device A 100 according to the first embodiment.

FIG. 10B It shows a truth table of the elementary device A 100 according to the first embodiment.

FIG. 10C It is a diagram illustrating a change of an input signal in relation to an output signal z of the elementary device A 100 according to the first embodiment.

BEST PERIOD FOR CARRYING OUT THE INVENTION

Embodiment 1

A first embodiment will be discussed with reference to FIG. 1 through FIG. 11. The first embodiment relates to an elementary device A for nonlinear transformation, an elementary device B for linear transformation, and a circuit processing cryptographic algorithms by using the elementary device A and the elementary device B. The XOR of n-bit data A and n-bit data B on a bit-by-bit basis will be referred to hereinafter also as A<XOR>B.

An arbitrary cryptographic algorithm F is always a combination of a nonlinear transformation $S_i$ ($0 \leq i \leq p$) and a linear transformation $L_j$ ($0 \leq j \leq q$) to ensure its security. This combination is necessary so as to be equivalently replaced by another combination of an AND (logical multiply) gate and an XOR (exclusive OR) gate when the algorithm is implemented by a digital circuit. Alternatively, the implementation is, of course, possible with any combinations of basic logic gates, such as OR (logic add), NOR (negative OR), NAND (negative AND), etc. All processes performed by those combinations may also be equivalently replaced by the combination of an AND gate and an XOR gate. Given this fact, a discussion will be given, focusing on the AND gate and the XOR gate. Claims, however, are directed to all the basic gates of AND, XOR, OR, NOR, NAND, etc.

First, a description is given of the elementary device A as a component of the nonlinear transformation $S_i$. A device as a component of a nonlinear transformation will be referred to hereinafter as the elementary device A. The nonlinear transformation $S_i$ is assumed to be formed by the elementary device A.

Figure 1:
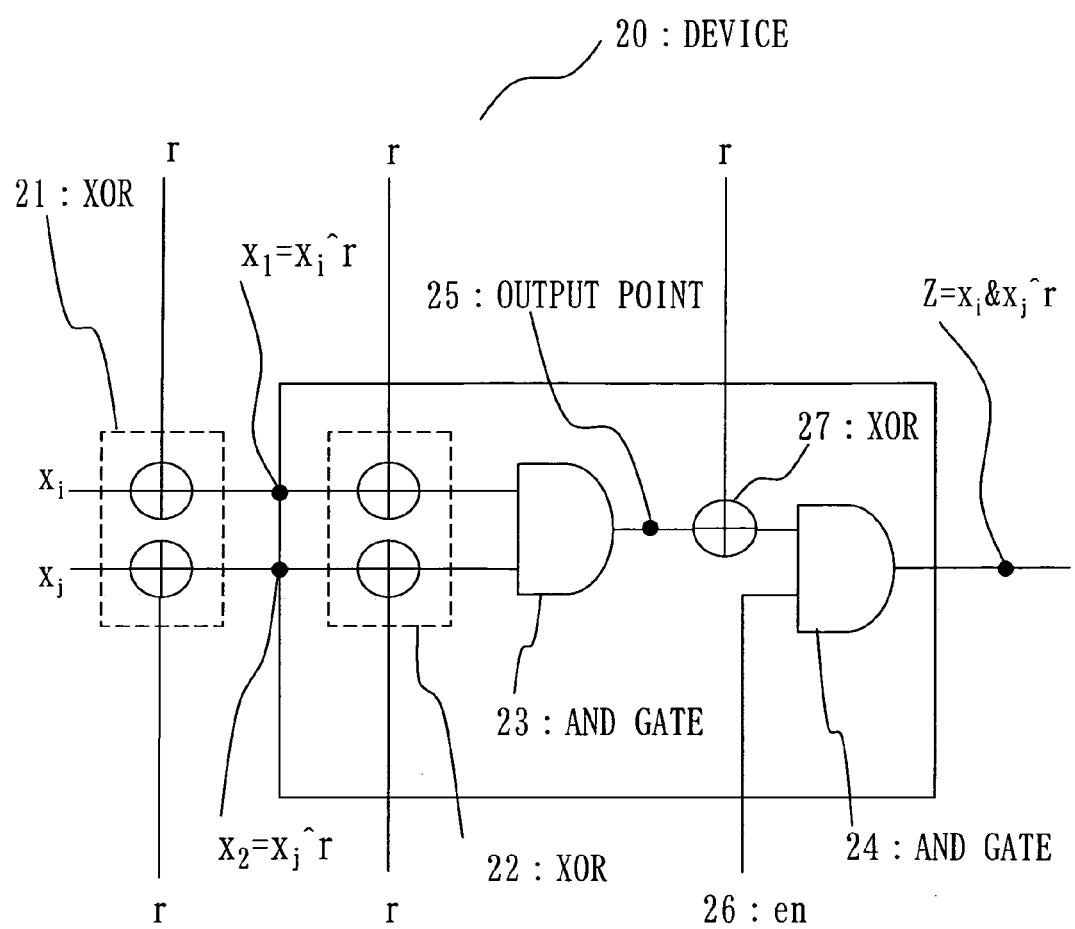
FIG. 1 It is a diagram illustrating a device 20, which is a convenient example provided for explaining the process of an elementary device A according to a first embodiment.

FIG. 1 is a diagram showing a device 20 of convenience for illustrating a process of the elementary device A, assuming that the elementary device A receives 2-bit input data ($x_1$, $x_2$). The device 20 of FIG. 1 shows a configuration of convenience to explain the process of the elementary device A. The device 20 is not shown as an embodiment of the elementary device A. A concrete embodiment of the elementary device A will be described later with reference to an elementary device A 100 in FIG. 6.

The device 20 includes an XOR 22, an AND gate 23, an XOR 27, and an AND gate 24. The device 20 receives $x_1(x_1=x_i\hat{\ }r)$ and $x_2(x_2=x_j\hat{\ }r)$, which are the XOR of ($x_i$, $x_1$) with a random number r, respectively. The device 20 also receives the random number r and a control signal en 26.

An operation of the device 20 is described.

(1) The device 20 receives $x_1(x_1=x_i\hat{\ }r)$ and $x_2(x_2=x_j\hat{\ }r)$, which are the XOR of the data ($x_i$, $x_1$) (an example of predetermined data) with the random number r (an example of the first random number).

(2) The XOR 22 receives ($x_1$,$x_2$) (an example of XOR data) and the random number r and performs an XOR operation. Specifically, "$x_i\hat{\ }r\hat{\ }r$" and "$x_j\hat{\ }r\hat{\ }r$" are executed. The XOR 22 then outputs $x_i$ and $x_j$.

(3) The AND gate 23 receives $x_i$ and $x_j$, and outputs "$x_i\&x_j$" (an output point 25).

(4) The XOR 27 receives the random number r (an example of a second random number) and "$x_i\&x_j$", and outputs "$x_i\&x_j\hat{\ }r$".

(5) The AND gate 24 receives "$x_i\&x_j\hat{\ }r$" and the control signal en 26, and outputs "$z=x_i\&x_j\hat{\ }r$" when the control signal en 26 is "1". This is however only an example. The operation of the elementary device A may be implemented by replacing the AND gate 24 by an OR gate if the control signal en is "0" effective.

If the control signal en is a kind of signal that determines effectiveness at a "leading edge" or a "trailing edge", then the AND gate 24 may be replaced by a flip-flop, so that the operation of the elementary device A is implemented by an operation of a system receiving the output of the XOR 27 at the "leading edge" or the "trailing edge" of the control signal en. To make the explanation simple, it is assumed the control signal en is "1" effective, and the operation of the elementary device A is explained with reference to the operation explained with the AND gate 24. Claims, however, are directed to all systems where signals are effective when "0", "1", "at a leading edge" and "at a trailing edge". This also applies to the elementary device B.

Next, a description is given of a case of n-bit input in contrast with the case of 2-bit input of the device 20 shown in FIG. 1. For example, n-input AND is implemented by the elementary device A that performs the following processes (1a) through (4a) in each nonlinear process of the nonlinear transformation $S_i$. The elementary device A receives X($x_1$, $x_2$, ..., $x_n$) of n-bit data, $R_a$ ($r_1$, $r_2$, ..., $r_n$) (an example of the first random number) of an n-bit random number, $r_b$ (an example of the second random number) of a 1-bit random number, and the control signal en (an example of a command signal). The elementary device A then outputs $z=((x_1\hat{\ }r_1)\&(x_2\hat{\ }r_2)\&\ldots(x_n\hat{\ }r_n)\hat{\ }r_b)\&en$.

(1a) The n-bit input X($x_1$, $x_2$, ..., $x_n$) (an example of XOR data) is XORed with the n-bit random number $R_a(r_1, r_2, \ldots,$ $r_n$) (note: $x_1$, $x_2$, etc. had already been XORed with the random number $R_a$ before being inputted). This is referred to as X'. With the device 20, $x_1 = x_i\hat{\ }r$, $x_2 = x_j\hat{\ }r$. A random number $R_a$ is $R_a = (r_1, r_2) = (r, r)$. Accordingly, $X' = (x_i, x_j)$.

(2a) All the bits of X' are ANDed. This is referred to as x". With the device 20, $x'' = x_i \& x_j$.

(3a) The x" is XORed with the 1-bit random number $r_b$. This is referred to as y. With the device 20, $r_b = r$, and $y = x_i \& x_j\hat{\ }r$.

(4a) The y and the control signal en are ANDed and then outputted. This is referred to as z. With the device 20, $z = x_i \& x_j\hat{\ }r$ as mentioned earlier. Note: z is outputted as soon as possible by setting the control signal en to "1" after all the input signals are settled.

All the processes of (1a) through (4a) are performed by a single arithmetic element. The elementary device A operates the processes, which forms the nonlinear transformation $S_i$. The output z is outputted as soon as possible by setting the control signal en to "1" after all the input signals are settled.

The elementary device A is characterized as follows. The elementary device A receives data that is obtained by XORing data to be processed by conventional cryptographic algorithms ($x_i$, $x_j$, etc.) with a random number. The elementary device A then XORs a result of a predetermined logic operation of data to be processed by the conventional process with a random number, and outputs an XOR result. The XOR result is outputted after all the input signals are settled. This characteristic makes it possible to defend against an attack trying to identify confidential information processed within the device by the power consumption thereof. Reasons of defence are as follows. The output z is the XOR of the random number r. The probability ratio of "0" and "1" appearing as the random number r is ½, so that the signal transition rate a of the output z is ½. In addition to this, the output signal z is outputted after the state transitions of all the input signals are completed and processes are performed. The "processes" here is a series of processes including: performing an XOR operation of X (XOR data), the n-bit data, with the random number $R_a$ (the first random number) to obtain n-bit data, performing an AND operation (an example of the predetermined logic operation) using each bit of the n-bit data obtained, and performing an XOR operation of a result of the AND operation (a logic operation) with the random number $r_b$ (the second random number). It is thus impossible for an attacker to detect any change in the power of the output z. The same is applied to the elementary device B, which will be discussed later. This characteristic will be further elaborated with reference to FIG. 8 to FIG. 11.

It is also possible to use one bit for the random number for the purpose of making the configuration of the elementary device A simplified. Specifically, (1b) The n-bit input X ($x_1, x_2, \ldots, x_n$) is XORed with an n-bit string of 1-bit random numbers r. This is referred to as X'. That is, $X' = (x_1\hat{\ }r, x_2\hat{\ }r, \ldots, x_n\hat{\ }r)$.

(2b) The X' is ANDed for all the bits. This is referred to as x". That is, $x'' = (x_1\hat{\ }r) \& (x_2\hat{\ }r) \& \ldots \& (x_n\hat{\ }r)$.

(3b) The x" is XORed with r. This is referred to as y. That is, $y = (x_1\hat{\ }r) \& (x_2\hat{\ }r) \& \ldots \& (x_n\hat{\ }r)\hat{\ }r$.

(4b) The y and the control signal en are ANDed, and the AND is to be outputted. This is referred to as z.

All the processes of (1b) to (4b) are executed by using a single arithmetic element, the result of which is the elementary device A, which forms $S_i$.

That is,

Elementary Device A (X) is:

$z = ((x_1\hat{\ }r) \& (x_2\hat{\ }r) \& \ldots (x_n\hat{\ }r)\hat{\ }r) \& en$ The elementary device B forming the linear transformation $L_j$ is now explained in outline.

A device forming a linear transformation will be referred to hereinafter as the elementary device B. It is assumed that the linear transformation $L_j$ is formed by the elementary device B. In each linear process of the linear transformation $L_j$, an n-input XOR is implemented by a device performing the process such as follows, for example.

(1c) The n-bit input X ($x_1, x_2, \ldots, x_n$) is XORed for all the bits. This is referred to as x'. That is, $x' = x_1\hat{\ }x_2\hat{\ }\ldots\hat{\ }x_n$.

(2c) The x' is XORed with the 1-bit random number r. This is referred to as y. That is, $y = (x_1\hat{\ }x_2\hat{\ }\ldots\hat{\ }x_n)\hat{\ }r$.

(3c) The y and the control signal en are ANDed, and the AND is to be outputted. This is referred to as z.

All the processes of (1c) to (3c) are executed by using a single arithmetic element. The elementary device B operates the processes, which forms $L_j$. That is, Elementary Device B (X) is:

$z = (x_1\hat{\ }x_2\hat{\ }\ldots\hat{\ }x_n\hat{\ }r) \& en$.

When the input X has been XORed with a random number component, e.g., an output from A(X), for example, then the process of (2c) is omitted if X is an odd number bit stream.

The control signal en used as an input to the elementary device A and the elementary device B is made to change considerably later than other input signals to the elementary devices change. Specifically, the elementary device A and the elementary device B each output a result in the form of:

"(an intermediate value of a cryptographic algorithm or a process result thereof)ˆ a random number value"

only when the control signal en is logical "1". In all other cases, 0 is always outputted. The cryptographic algorithm F is formed by using the elementary device A and the elementary device B. Like the case of the "last transformation layer" of FIG. 2 discussed below, a ciphertext or a plaintext may be obtained by XORing a result from the elementary device A or the elementary device B with the same random number used in the previous process.

Figure 2:
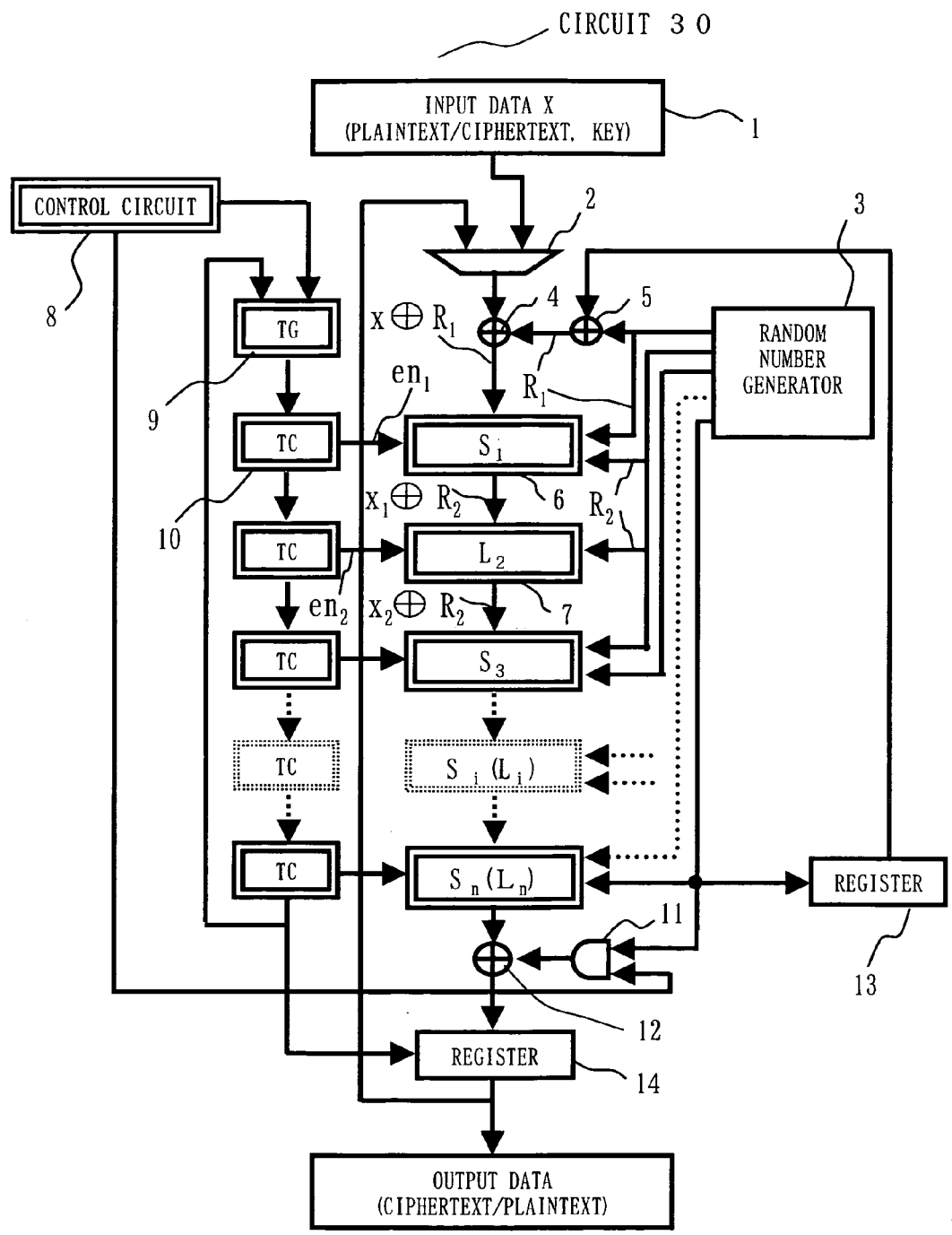
FIG. 2 It is a block diagram illustrating a schematic configuration of a circuit 30 according to the first embodiment.

A description is now given of a circuit that processes cryptographic algorithms using the elementary device A and the elementary device B with reference to FIG. 2. FIG. 2 is a schematic block diagram of a configuration of a circuit 30 that processes the cryptographic algorithm F using the elementary device A and the elementary device B. Application algorithms are not limited because the elementary device A and the elementary device B are countermeasures against the basic operation of cryptographic algorithms of the smallest unit.

The circuit 30 includes a selector 2, a random number generator 3, an XOR 4, an XOR 5, nonlinear transformations $S_1$ 6 etc., linear transformations $L_2$ 7 etc., a control circuit 8, a timing generation circuit TG 9, a timing control circuit TC 10, an AND gate 11, an XOR 12, a register 13, and a register 14. The nonlinear transformation $S_1$ 6, the linear transformation $L_2$ 7, etc. are formed in layers. A nonlinear transformation $S_i$ is formed by the elementary device A. A linear transformation $L_j$ is formed by the elementary device B.

Figure 3:
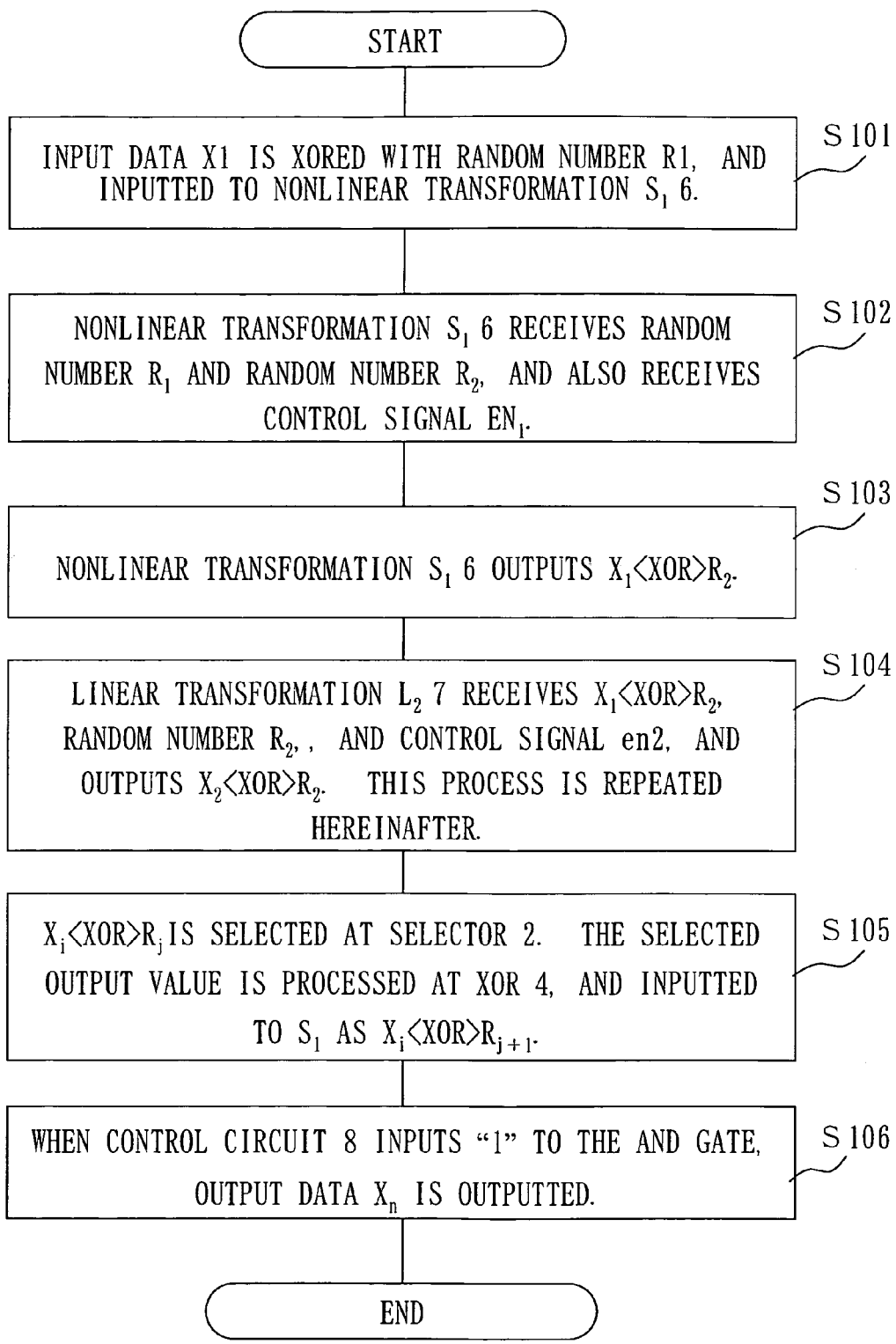
FIG. 3 It is a flow chart illustrating an operation of the circuit 30 according to the first embodiment.

FIG. 3 is a flow chart illustrating an operation of the circuit 30 shown in FIG. 2. An operation of the circuit 30 is explained with reference to FIG. 3.

Input data X1 (a plaintext, a ciphertext, a key, etc.) is XORed with a random number $R_1$ at the XOR 4, thereby obtaining X<XOR>$R_1$, which is inputted to the nonlinear transformation $S_1$ 6 (S101). FIG. 2 shows an example of layer formation in the order of the nonlinear transformation $S_1$ 6, the linear transformation $L_2$, etc. This is only an example. The order of the layers of nonlinear transformation and linear transformation, and the number of layers depend on the algorithm F and the implementation method thereof. An input from above to the XOR 5 is 0. An output at the top from the random number generator 3 is the random number $R_1$. Inputs from the right to the nonlinear transformation $S_1$ 6 are the random number $R_1$ and the random number $R_2$. From the left the nonlinear transformation $S_1$ 6 receives the control signal $en_1$ (S102). The control signal $en_1$ changes to "1" later than the changes of the input signals of X<XOR>$R_1$, $R_1$, and $R_2$. This control is performed by the control circuit 8, the timing generation circuit TG 9, and the timing control circuit TC 10. The nonlinear transformation $S_1$ 6 outputs $X_1$<XOR>$R_2$ (S103). Likewise, the linear transformation $L_2$ 7 receives the input signals of $X_1$<XOR>$R_2$, $R_2$ and a control signal $en_2$ that changes later than these signals change. The linear transformation $L_2$ 7 then outputs $X_2$<XOR>$R_2$. The processes of nonlinear transformation and linear transformation are repeated in the same manner. (S104).

When the nonlinear transformation and the linear transformation are processed in the same circuit, a result $X_1$<XOR>$R_1$ outputted from the last transformation layer $S_n$ (or $L_n$) is selected by the selector 2, and inputted to the XOR 4 again. In this case, an input from above to the XOR 5 is $R_j$, and an output from the top of the random number generator 3 is $R_{j+1}$. The XOR 4 thus receives $R_j$<XOR>$R_{j+1}$ from the right and outputs $X_i$<XOR>$R_{j+1}$ (S105).

The control circuit 8 inputs "1" to the AND gate 11 after the processes of nonlinear transformation and linear transformation required for the process of the cryptographic algorithm F are completed. A result $X_n$<XOR>$R_m$ outputted from the last transformation layer $S_n$ (or $L_n$) is then XORed with $R_m$ at the XOR 12, and data $X_n$ is thus outputted (S106).

Figure 4:
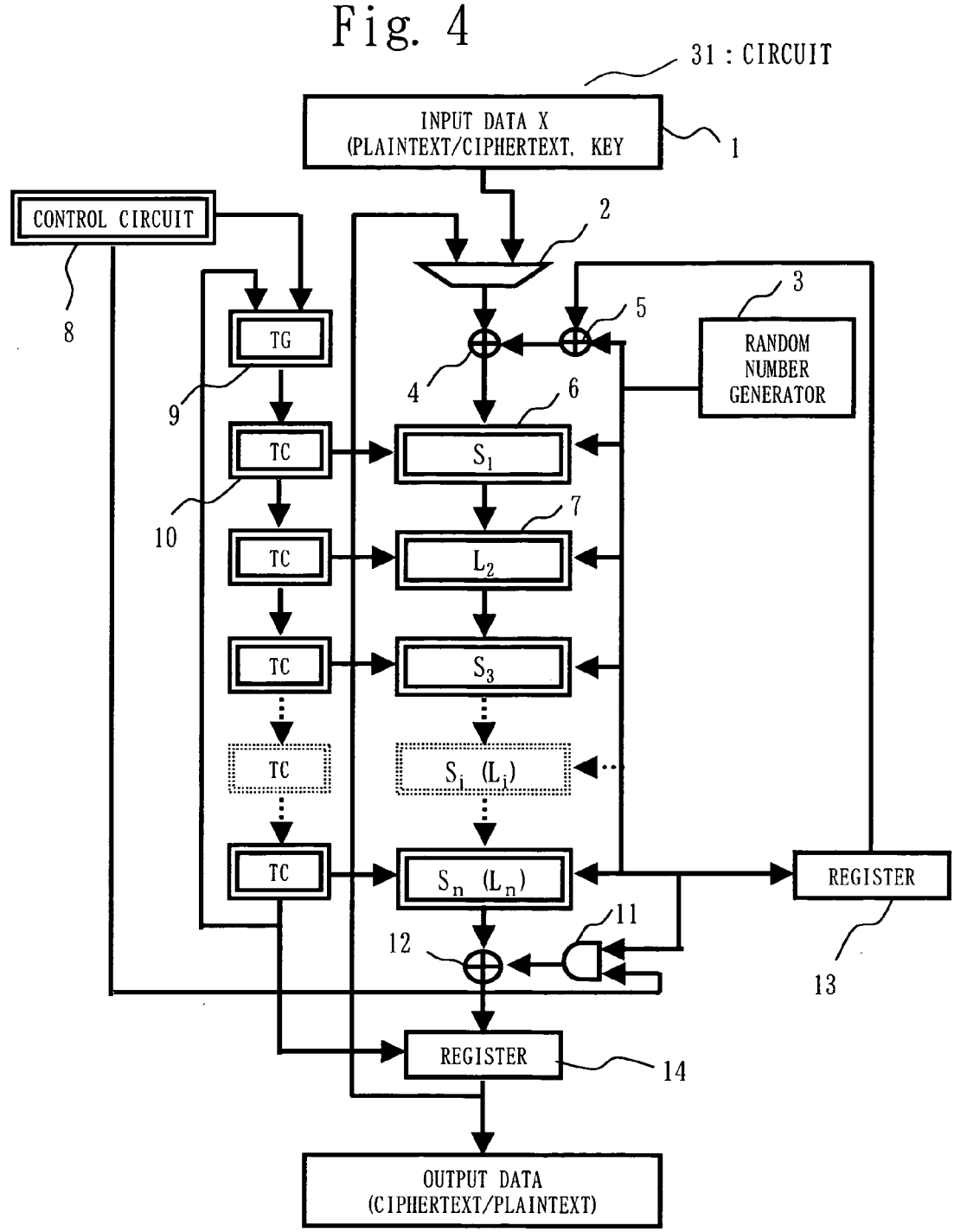
FIG. 4 It is a diagram illustrating a configuration of a circuit 31 according to the first embodiment.

FIG. 4 is a diagram illustrating a configuration of a simplified circuit 31 where the number of random number is reduced to 1 bit in contrast to the circuit 30 shown in FIG. 2. The nonlinear transformation $S_1$ of the circuit 31, for example, is formed by the elementary device A using a 1-bit random number only mentioned earlier. The circuit 31 may minimize the number of random numbers used on the circuit and therefore may be implemented with a smaller area of circuit than that of the circuit 30.

Figure 5:
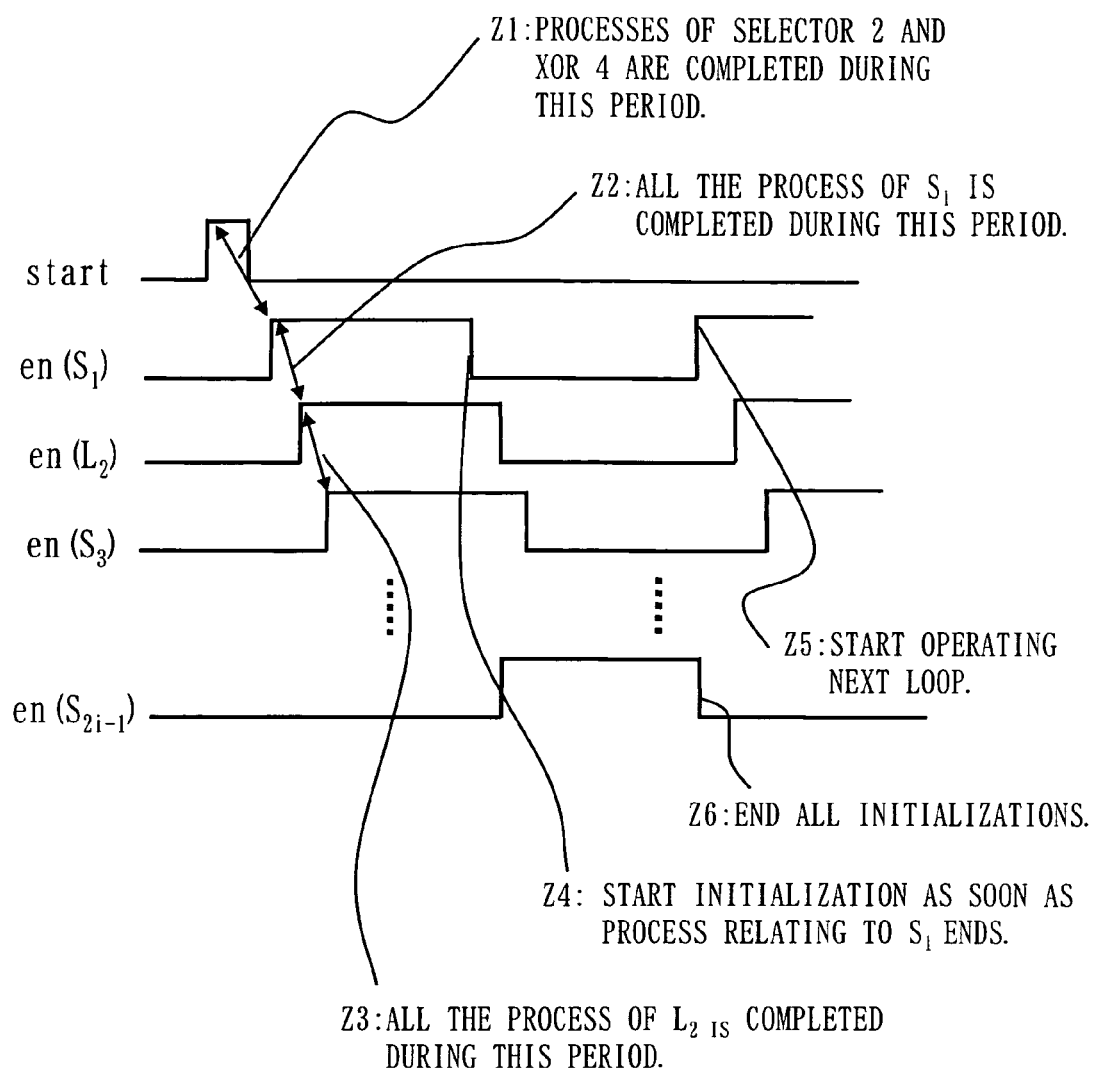
FIG. 5 It is a timing chart of control signals used in the layers of the circuit 30 and the circuit 31 according to the first embodiment.

FIG. 5 is a timing chart illustrating the timing of control signals used in each layer of the circuit 30 of FIG. 2 and the circuit 31 of FIG. 4. When a "start" signal becomes effective to start the process of cryptographic algorithms, the process of the input data X1 is performed and then completed at the selector 2 and the XOR 4. When the process results thereof are fully transmitted to the elementary device A that forms the nonlinear transformation $S_1$, the control signal en ($S_1$) of the first layer $S_1$ changes to logic 1. Then, $S_1$ outputs an arithmetic result, and data is transmitted to the elementary device B that forms $L_2$. When all data is transmitted, the control signal ($L_2$) of $L_2$ changes to logic 1. This operation is repeated in the subsequent layers. The control signal en ($S_{2i-1}$) of the final layer $S_{2i-1}$ finally changes to logic 1.

The control signals need initialization to obtain logic 0 for another arithmetic operation. The initialization system may include a method of initialization performed after all operations are done. Another method, like the one shown in FIG. 5, starts sequential initialization from the top layer. According to the method of sequential initialization from the top layer, waiting time before the start of the next operation may be shortened, thereby implementing high speed processing. This method, however, requires a register between a layer to be initialized and the next layer in order to store an output from the layer to be initialized. Hence, circuit costs are increased.

Figure 6:
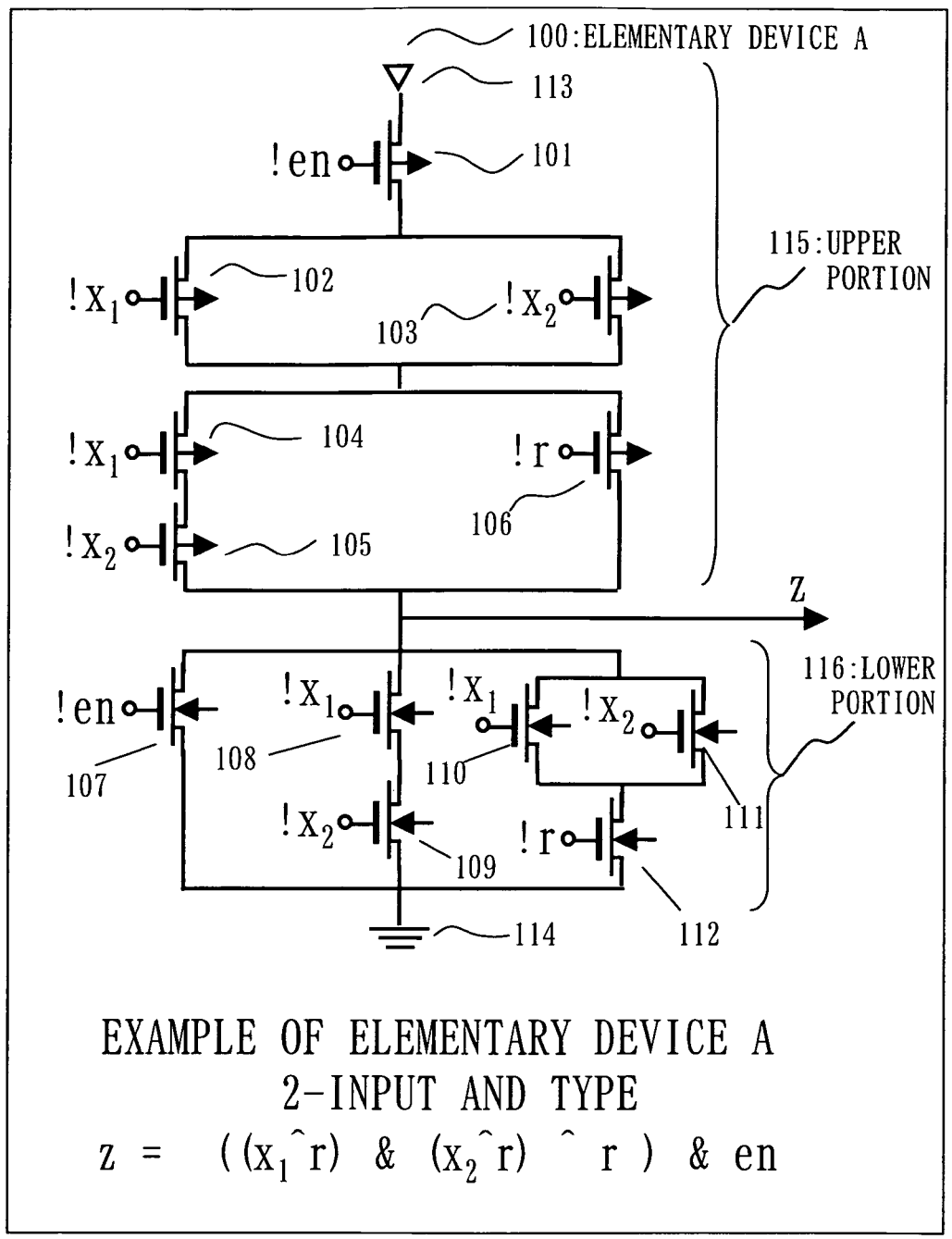
FIG. 6 It is a diagram of an elementary device A 100 according to the first embodiment.

FIG. 6 is a diagram of the elementary device A 100 of a transistor configuration as a concrete embodiment of the previously described elementary device A. The elementary device A 100 of FIG. 6 receives $x_1(x_1=x_i\hat{\ }r)$, $x_2(x_2=x_j\hat{\ }r)$, the random number r, and the control signal en (an example of a command signal), and outputs $z=((x_1\hat{\ }r)\&(x_2\hat{\ }r)\hat{\ })\&en$, where the random numbers r that are XORed with $x_1$ and $x_2$ are the first random number. The third random number r in the equation of z is the second random number.

A configuration of the elementary device A 100 is explained with reference to FIG. 6.

(1) The elementary device A 100 is formed by series-connected upper portion 115 and lower portion 116. An output signal z is outputted between the upper portion 115 and the lower portion 116.

(2) In FIG. 6, a sign "!" denotes an inversion of a signal. A right-pointing arrow "→" added to each transistor forming the upper portion 115 means that the transistor becomes ON when the signal is "0". A left-pointing arrow "←" added to each transistor forming the upper portion 116 means that the transistor becomes ON when the signal is "1". The upper portion 115 is therefore an aggregate of transistors that become ON when a signal is "0". The lower portion 116 is therefore an aggregate of transistors that become ON when a signal is "1". A voltage applying portion 113 receives voltage corresponding to logic "1".

(3) When voltage corresponding to logic "1" is applied to the voltage applying portion 113, $z=((x_1\hat{\ }r)\&(x_2\hat{\ }r)\hat{\ })\&en$ is outputted by switching performed by the respective transistors.

(4) The transistor configuration of the elementary device A 100 is explained. The upper portion 115 includes a serial connection of a transistor 101, a parallel circuit of transistors 102 and 103, and a parallel circuit of series-connected transistors 104 and 105 and a transistor 106.

(5) The lower portion 116 is formed by a parallel connection of a transistor 107, series-connected transistors 108 and 109, and series-connected parallel circuit of transistors 110 and 111 and a transistor 112. The transistors 107, 109 and 112 are connected to an earth 114 at one end.

(6) An input signal is now explained. A signal is always inverted before inputted to a transistor.
An input signal $x_1$, inverted, is inputted to the transistor 102, the transistor 104, transistor 108, and transistor 110.

(7) An input signal $x_2$, inverted, is inputted to the transistor 103, the transistor 105, the transistor 109, and the transistor 111.

(8) An input signal r, inverted, is inputted to the transistor 106 and the transistor 112.

(9) An input signal en, inverted, is inputted to the transistor 101 and the transistor 107.

The elementary device A 100, as mentioned earlier, receives $x_1$ and $x_2$, which are data obtained by XORing $x_i$ and $x_j$ with the random number r, respectively, then applies a predetermined logic operation to $x_i$ and $x_j$, then XORs a result thereof with the random number r, and outputs an XOR. The output is performed as soon as when all input signals are settled. Consequently, an output signal is not affected by the transient transition of an input signal. In addition to this, an output is performed all at once without generating intermediate data between an input and an output. This makes it possible to defend against an attack that tries to identify confidential information by power consumption.

The elementary device A 100 of FIG. 6 is a 2-input AND type, and outputs the following z as mentioned above:
$A(x_1,x_2): z=((x_1\hat{\ }r)\&(x_2\hat{\ }r)\hat{\ }r)\&en$,
where $x_1=x_i\hat{\ }r$, and $x_2=x_j\hat{\ }r$.

When the nonlinear transformation $S_1$ of FIG. 4 is formed by the elementary device A 100, the following is given. Inputs to the nonlinear transformation $S_1$, $X<XOR>\{r, r, r, \ldots, r\}$, r and the control signal en, are processed as follows. The elementary device A 100 processes arbitrary two bits using $A(x_i\hat{\ }r, x_j\hat{\ }r)$, and then outputs z. That is,
$z=(((x_i\hat{\ }r)\hat{\ }r)\&((x_j\hat{\ }r)\hat{\ }r))\&en$.
When en=1, then
$z=x_i\&x_j\hat{\ }r$
is outputted.

FIG. 7 shows a truth table of the elementary device A 100. When $x_1=0$, the signal transition rate $\alpha(x_1=0)$ of the signal of output z changing "from 0 to 1" or "from 1 to 0" is:
$\alpha(x_1=0)=P0\times P1(x_1=0)+P1\times P0(x_1=0)=\frac{1}{2}$,
where PO is a probability when z is "0", and P1 is a probability when z is "1". According to the truth table,
$PO=\frac{4}{8}$, and
$P1=\frac{4}{8}$.
$P1(x_1=0)$ is a probability of z being "1" under the condition that $x_1=0$. $P0(x_1=0)$ is a probability of z being "0" under the condition that $x_1=0$. According to the truth table,
$P0(x_1=0)=\frac{3}{4}$, and
$P1(x_1=0)=\frac{1}{4}$.
Therefore:
$\alpha(x_1=0)=P0\times P1(x_1=0)+P1\times P0(x_1=0)$
$=\frac{4}{8}\times\frac{1}{4}+\frac{4}{8}\times\frac{3}{4}=\frac{1}{2}$.
With $x_1=1$, according to the truth table,
$P0(x_1=1)=\frac{1}{4}$, and
$P1(x_1=1)=\frac{3}{4}$
when calculated in the same manner.
Therefore,
$\alpha(x_1=1)=P0\times P1(x_1=1)+P1\times P0(x_1=1)$
$=\frac{4}{8}\times\frac{3}{4}+\frac{4}{8}\times\frac{1}{4}=\frac{1}{2}$.
Therefore, the signal transition rate $\alpha$ is the same when the input $x_1$ (or $x_2$) is 0 as when it is 1. The output z is outputted as soon as by the control signal en when input signals are settled. Consequently, an output signal is not affected by the transient transition of an input signal. In addition to this, output is performed at once without generating intermediate data between an input and an output. Therefore, with the elementary device A, it is not possible to predict confidential information by power consumption.

Figures 8A, 8B, 8C:
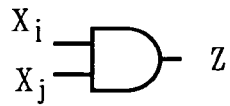
FIG. 8A It shows a 2-input AND gate.
FIG. 8B It shows a truth table of the 2-input AND gate.
FIG. 8C It is a diagram illustrating a signal transition rate of the 2-input AND gate.

FIG. 8A to FIG. 8C are diagrams illustrating the roles of the random number r and the control signal en in the elementary device A 100. When the previously mentioned process of $x_i\&x_j$ in the elementary device A 100 is performed without using the random number r and the control signal en, the result becomes the same as that of the 2-input AND gate shown in FIG. 8A. FIG. 8B is the truth table of this case. According to the truth table of FIG. 8B, the signal transition rate $\alpha$ is:
$\alpha(x_i=0)=\frac{1}{4}$ when $x_i=0$, and
$\alpha(x_i=1)=\frac{1}{2}$ when $x_i=1$.
Thus, the signal transition rates $\alpha$ are different.

A more detailed explanation is given with reference to FIG. 8C. First, when $x_j=0$, a signal transition rate $\alpha(x_i=0)$ of the signal of the output z changing "from 0 to 1" or "from 1 to 0" is:
$\alpha(x_i=0)=P0\times P1(x_i=0)+P1\times P0(x_i=0)=\frac{1}{4}$.
Note: PO is a probability of z being "0", and P1 is a probability of z being "1". According to the truth table of FIG. 8B, $P0=\frac{3}{4}$ and $P1=\frac{1}{4}$. $P1(x_j=0)$ is a probability of z being "1" under the condition of $x_i=0$. $P0(x_i=0)$ is a probability of z being "0" under the condition of $x_i=0$.
According to the truth table,
$P0(x_i=0)=1$, and
$P1(x_i=0)=0$.
Therefore:
$\alpha(x_i=0)=P0\times P1(x_i=0)+P1\times P0(x_i=0)$
$=\frac{3}{4}\times\frac{1}{2}+\frac{1}{4}\times 1=\frac{1}{4}$.
When $x_i=1$, according to the truth table,
$P0(x_i=1)=\frac{1}{2}$ and $P1(x_i=1)=\frac{1}{2}$
are obtained in the same manner. Therefore,
$\alpha(x_i=1)=P0\times P1(x_i=1)+P1\times P0(x_i=1)$
$=\frac{3}{4}\times\frac{1}{2}+\frac{1}{4}\times\frac{1}{2}=\frac{1}{2}$.
Consequently, as mentioned above,
$\alpha(x_i=0)=\frac{1}{4}$ when $x_i=0$, and
$\alpha(x_i=1)=\frac{1}{2}$ when $x_i=1$.
Thus, the signal transition rate $\alpha$ is biased.

Thus, with the 2-input AND shown in FIG. 8A, there is a power difference between when an input, $x_i$ (or $x_j$), is 0 and when it is 1. Consequently, power consumption may be used to predict an input to the AND gate. This makes it possible to identify confidential information used in the process.

Next, a description is given of the control signal en with reference to FIG. 9A to FIG. 9C. FIG. 9A shows an elementary device A' that does not use the control signal en. With the elementary device A', when there is a time difference between the changes in the input signals, signal changes independent of random numbers occur in transient transition, which causes bias in the signal transition rate $\alpha$. This makes it impossible to identify confidential information. FIG. 9B shows a truth table of the elementary device A' of FIG. 9A. FIG. 9C shows a signal transition rate a of the elementary device A'. According to the truth table of FIG. 9B, both the signal transition rate $\alpha$ ($x_i=0$) and the signal transition rate a ($x_i=1$) relating to the output z are $\frac{1}{2}$. When there is a time difference between the changes in the input signals, however, the following is given. With the elementary device A', when a signal changes in the order of $x_i$, $x_j$, and r, as shown in FIG. 9C, similar bias to that of FIG. 8C occurs in the signal transition rate a during the time when $x_j$ changes, for example. Consequently, power consumption may be used to predict an input to the AND gate. If the changing order of $x_i$, $x_j$, and r is different, bias occurs but with a time difference. There is no problem when there is no time difference in the changes of the input signals.

FIG. 10A to FIG. 10C are diagrams illustrating a process of the elementary device A 100.

FIG. 10A shows inputs to and an output from the elementary device A 100.

FIG. 10B shows a truth table of the elementary device A 100.

FIG. 10C is a diagram illustrating a relationship between the changes of the input signals and an output signal z.

In FIG. 10C, according to the truth table of FIG. 10B, the signal transition rate $\alpha$ is $\frac{1}{2}$, regardless of the values, 0 or 1, of $x_i$ and $x_j$. In addition to this, as shown in FIG. 10C, the output z of the elementary device A 100 is always 0 when the control signal en is 0. Therefore, if the control signal en is made to 1 after changes are made to the signals $x_i$, $x_j$, and r, then transient transition does not occur to the output z, so that transition occurs always with an equal transition rate $\alpha$. It is impossible therefore to specify confidential information from power consumption As mentioned above, the input/output values are processed as follows. Values to be processed in a conventional process, $x_i$, $x_j$, etc. are XORed with the random number, processed in the operation using the control signal en, and a result may then be outputted. There is an alternative process system that may output an arbitrary value. These systems may be applied to an three- or more input AND operation and three- or more input other operations of such as OR, NOR, NAND, XOR, etc. to form a nonlinear transformation layer or a linear transformation layer.

Figure 11:
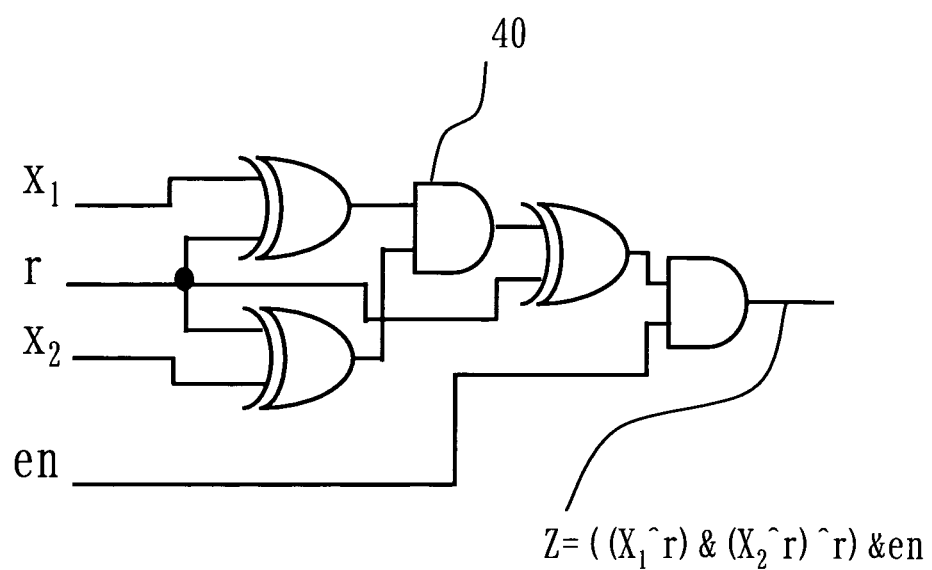
FIG. 11 It is a diagram showing a circuit that is logically equivalent to the elementary device A 100.

When the elementary device is formed by the previously described method, if the device is simply a combination of conventional basic gates and performs the same operation as that mentioned above, the device does not function as countermeasures. FIG. 11 shows an equivalent circuit to one shown in FIG. 6, for example. An AND circuit 40 of FIG. 11 performs the process of $x_i \& x_j$, which means that the operation of the gate is therefore the same as that of one of FIG. 8A. Accordingly, bias will occur in the signal transition rate $\alpha$, so that an input to the AND gate 40 becomes predictable. The "equivalent circuit" of FIG. 11 and the device 20 of FIG. 1 are equivalent. At the output point 25 of the device 20, like the AND gate 40, bias occurs in the signal transition rate $\alpha$. For this reason, the device 20 is a convenient configuration for the explanation of the elementary device A. In order to prevent confidential information from leaking from power consumption, a conventional value of an input/output value is XORed with a random number, and a result is outputted at once by the control signal en. To implement this process, it is required to perform the process by a single arithmetic element for outputting the output z at once like the elementary device A 100 of FIG. 6.

A system that equalizes the signal transition rate a with complementary circuits, such as the gate pair of JP2003526134T or the circuit pair of JP2002311826, etc., does not function as countermeasures unless the complementary circuits operate with the same timing. The elementary device A 100 of the first embodiment, however, uses a single arithmetic element to make the signal transition rate a equal. In addition to this, transient transition does not occur in the output z. For this reason, such a condition mentioned above that "it is required that complementary circuits operate with the same timing" is not needed. Therefore, efficient countermeasures may be implemented. In addition to this, the elementary device A 100 of FIG. 6 is provided with a single output line only. Therefore, there is no need for considering "load equalization of output lines", which is needed to be considered with the gate pair or the circuit pair.

The elementary device A according to the first embodiment receives XOR data X of the n-bit data and the random number $R_a$, performs the predetermined logic operation, and outputs the XOR of a result of the logic operation and the random number $r_b$ as the output signal. Therefore, the signal transition rate of the output signal may be made equal. Thus, the bias in power consumption may be eliminated, thereby defending against an attack trying to identify confidential information by power consumption.

According to the elementary device A of the first embodiment, a single kind of the random number r is used for processing, thereby minimizing the number of kinds of random numbers to be used. Therefore, the area of implementation may be made smaller than that when using multiple kinds of random numbers.

The elementary device A according to the first embodiment performs processing when the state transition of the input signal is completed, and then output the output signal. Therefore, the signal transition of the output may be made equal.

The elementary device A according to the first embodiment outputs the output z by using the control signal en (a command signal) that instructs the elementary device A to output it. Therefore, the signal transition rate may be made equal.

The elementary device A 100 according to the first embodiment may serve to defend against an attack trying to identify confidential information by power consumption. In addition to this, the elementary device A 100 is the hardware based countermeasures with the transistor circuit configuration. Therefore, higher speed processing is possible with the elementary device A 100 than software based countermeasures.

The elementary device A 100 according to the first embodiment uses the single kind of the random number r for processing, thereby serving to minimize the number of the kinds of random numbers to be used. Therefore, the area of implementation may be made smaller than that when using multiple kinds of random numbers.

The elementary device A 100 according to the first embodiment outputs the output z by using the control signal en (a command signal) that instructs the elementary device A to output it. Therefore, the signal transition rate may be made equal.

Embodiment 2

A second embodiment is now discussed with reference to FIG. 12A to FIG. 16. In the second embodiment, an LUT 200 (shown in FIG. 15 elaborated later) is described. The LUT 200 may implement an equivalent function to that of the elementary device A 100 of the first embodiment shown in FIG. 6 by using a memory element.

First, a configuration method of DES S-boxes as an example of a nonlinear layer is described. Then, an application of the LUT 200 to the S-boxes will be discussed.

The "S-box" is a conversion table that is used for an operation in which a predetermined output is performed upon receipt of a specific input. DES defines eight kinds of tables for 6-bit inputs and 4-bit outputs. A conversion table such as this may be implemented by AND-XOR circuits alone.

Figures 12A, 12B, 12C:
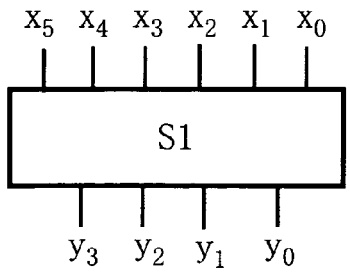
FIG. 12A It is a diagram showing inputs/outputs of a table S1 that is defined by a DES algorithm.
FIG. 12B It is a diagram showing a content of the table S1.
FIG. 12C It is a diagram showing an example of an input value and an output value.

FIG. 12A is a diagram showing inputs/outputs of a table S1 that is defined by a DES algorithm. As shown in FIG. 12A, the table S1 receives 6-bit data $\{X_5, X_4, X_3, X_2, X_1, X_0\}$, converts the data to 4-bit data $\{y_3, y_2, y_1, y_0\}$, and then outputs the 4-bit data.

FIG. 12B is a diagram showing the content of the table S1. Referring to the table S1 of FIG. 12B, a row is determined by $\{X_5, X_0\}$ of the input data $\{X_5, X_4, X_3, X_2, X_1, X_0\}$. A column is determined by $\{X_4, X_3, X_2, X_1\}$.

FIG. 12C is a diagram showing an example of an input value and an output value. When
$\{X_5, X_4, X_3, X_2, X_1, X_0\} = \{011011\}$, then
$\{X_5, X_0\} = \{01\} = 1$.
Therefore, the second row is determined of the table S1. Then, $\{X_4, X_3, X_2, X_1\} = \{1101\} = 13$.
Therefore, the 14th column is determined of the table S1. Therefore, $\{011011\}$ is converted to "5" (0101) in the second row at the 14th column.

Figure 13:
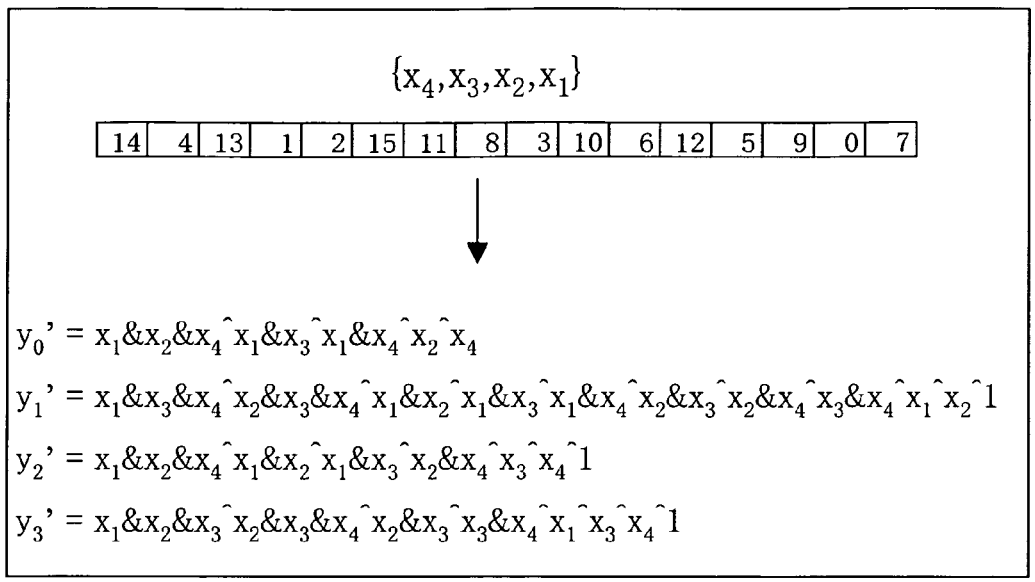
FIG. 13 It shows equations obtained by processing data of the first row of the table S1 by equivalent transformation.
Figure 14:
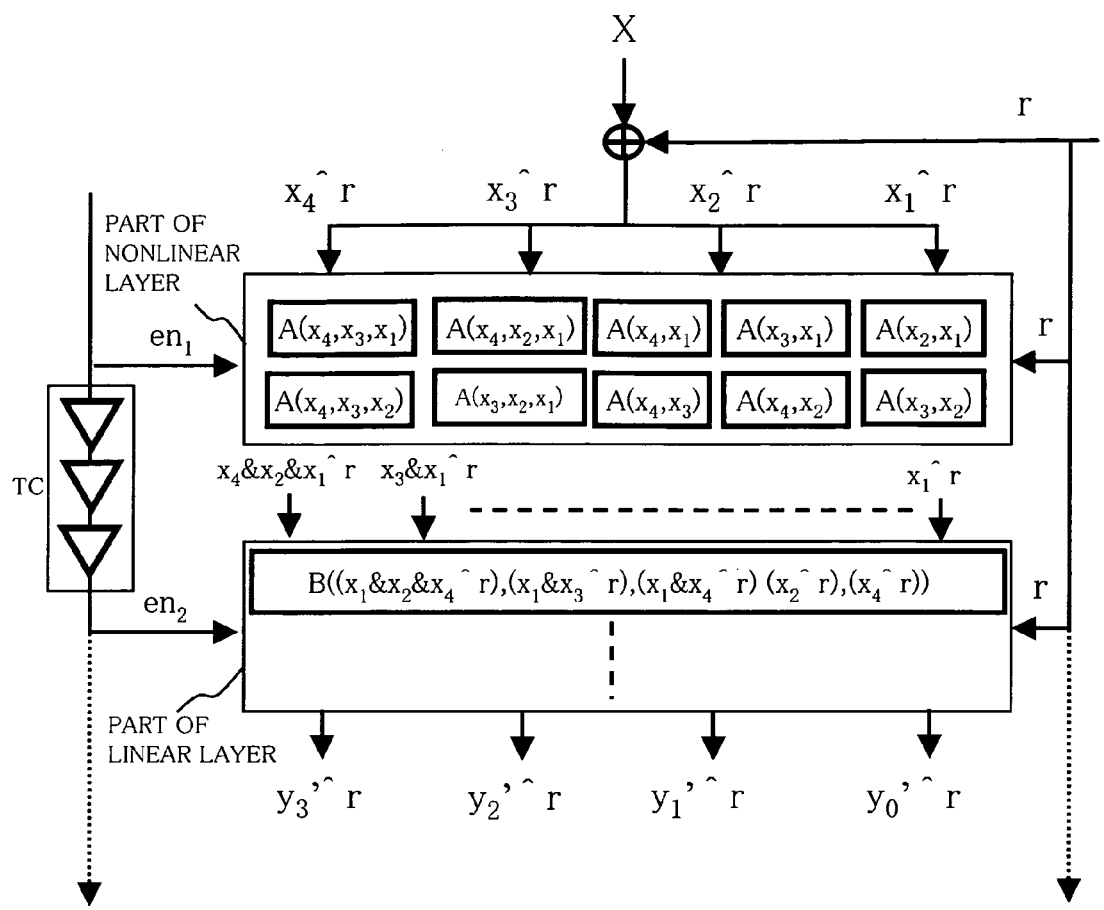
FIG. 14 It is a diagram illustrating a circuit configuration for executing the equations shown in FIG. 13.

Equivalent transformations are possible from "14, 4, 13, . . . 0, 7" of the first row of the table S1 in FIG. 12B to the equations of $y_0'$ to $y_3'$ shown in FIG. 13. Likewise, the second and subsequent rows may also be transformed. The equations of FIG. 13, like the case of the circuit 31 of FIG. 4, may be formed by a single nonlinear layer and a single linear layer like the one shown in FIG. 14. Referring to FIG. 14, like the case of FIG. 4, input data is XORed with the random number r before being inputted to a nonlinear layer. Then, an AND operation is performed in the first layer of the nonlinear layer, and then an XOR operation is performed in the second layer of the linear layer.

Figure 15:
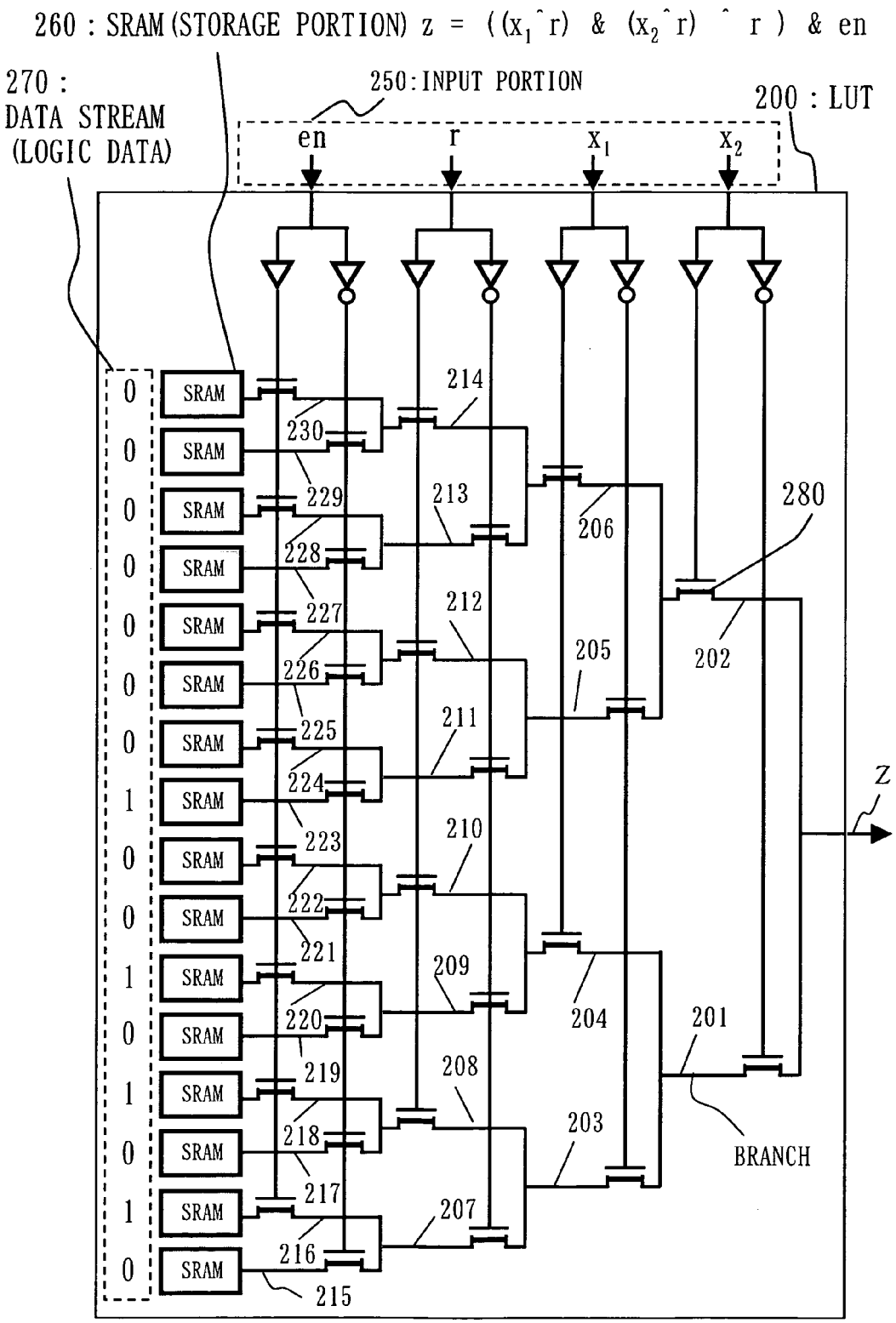
FIG. 15 It is a diagram of a LUT 200 according to a second embodiment.

The previously explained countermeasures are assumed to be formed by MOSFET (Metal Oxide Semiconductor Field Effect Transistor) like the elementary device A 100 of FIG. 6. Alternatively, however, it is also possible that a MOSFET level design is not used in a circuit for cryptographic algorithms. For example, a rewritable semiconductor device typified by FPGA (Field Programmable Gate Array) may also be used. In this case, the designer is allowed to alter the internal state of a memory element (referred to hereinafter as LUT) that is formed by SRAM (Static Random Access Memory) mounted on a chip in advance, the internal state of a storage element typified by a flip-flop, and the wiring thereof only. FIG. 15 shows an embodiment using such a device.

FIG. 15 is a diagram illustrating a configuration that implements an equivalent function to the elementary device A 100 of FIG. 6 using the LUT 200 having four inputs and one output.

The LUT 200, which is equivalent to the elementary device A 100, receives the inputs of $x_1$, $x_2$, r and en. The output z is: $z=((x_1\hat{\ }r)\&(x_2\hat{\ }r)\hat{\ }r)\&en$.

The LUT 200 includes an input portion 250, a plurality of SRAMs 260 etc. (storage portions), and a plurality of pass-transistors 280 etc. The SRAM has a function to store a value to implement a logic function. A data stream 270 (logic data) is formed by data stored in the SRAMs. The pass-transistor has a function to switch right and left connections.

The configuration of the LUT 200 shown in FIG. 15 is explained. A pass-transistor is placed at each branch in a tree structure. The pass-transistors are placed each at thirty branches, branch 201 to branch 230. An input signal line switches ON/OFF of the pass-transistor provided at each branch. The pass-transistor as a switching function opens when receiving "0".

(1) Next, a configuration of the LUT 200 is explained. With the LUT 200, the output z branches into two branches of the branch 201 and a branch 202. The branch 202 branches into two branches of a branch 205 and a branch 206. The branch 205 branches into two branches of a branch 211 and a branch 212. The branch 206 branches into two branches of a branch 213 and a branch 214. The branch 211 branches into two branches of a branch 223 and a branch 224. The branch 212 branches into two branches of a branch 225 and a branch 226. The branch 213 branches into two branches of a branch 227 and a branch 228. The branch 214 branches into two branches of a branch 229 and the branch 230. Each of "the branch 223, the branch 224, . . . , and the branch 230" is connected to a SRAM.

(2) The branch 201 branches in a similar manner to the branch 202. The branch 201 branches into two branches of a branch 203 and a branch 204. The branch 203 branches into two branches of a branch 207 and a branch 208. The branch 204 branches into two branches of a branch 209 and a branch 210. The branch 207 branches into two branches of a branch 215 and a branch 216. The branch 208 branches into two branches of a branch 217 and a branch 218. The branch 209 branches into two branches of a branch 219 and a branch 220. The branch 210 branches into two branches of a branch 221 and a branch 222. Each of "the branch 215, the branch 216, . . . , and the branch 222" is connected to a SRAM. In FIG. 15, the SRAMs connected to the branch 216, the branch 218, and the branch 220 each store "1". The other SRAMs each store "0".

(3) An input signal is explained. An inverted signal of the input signal $x_2$ is inputted to a pass-transistor placed at the branch 201. The input signal $x_2$ is inputted to a pass-transistor placed at the branch 202. An inverted signal of the input signal $x_1$ is inputted to pass-transistors placed at the branch 203 and the branch 205. The input signal $x_1$ is inputted to pass-transistors placed at the branch 204 and the branch 206. An inverted signal of the input signal r is inputted to pass-transistors placed at the branch 207, the branch 209, the branch 211, and the branch 213. The input signal r is inputted to pass-transistors placed at the branch 208, the branch 210, the branch 212, and the branch 214. An inverted signal of the input signal en is inputted to pass-transistors placed at the branch 215, the branch 217, the branch 219, the branch 221, the branch 223, the branch 225, the branch 227, and the branch 229. The input signal en is inputted to pass-transistors placed at the branch 216, the branch 218, the branch 220, the branch 222, the branch 224, the branch 226, the branch 228, and the branch 230.

If the control signal en is "0" effective, then the process of "&en" in the previously mentioned $z=((x_1\hat{\ }r)\&(x_2\hat{\ }r)\hat{\ }r)\&en$ changes to "|en" (OR with the control signal en). An equivalent function to the elementary device A may thus be implemented by LUT in the same way.

If the input signals $x_1$, $x_2$ and r are inputted at the same time, then the control signal en is not needed. In this case, transistors corresponding to the signals perform switching at the same time.

If the same process system is also applied to OR, NOR, NAND, XOR, etc. that receive two inputs, then an attack trying to identify confidential information by power consumption may be defended.

Figure 16:
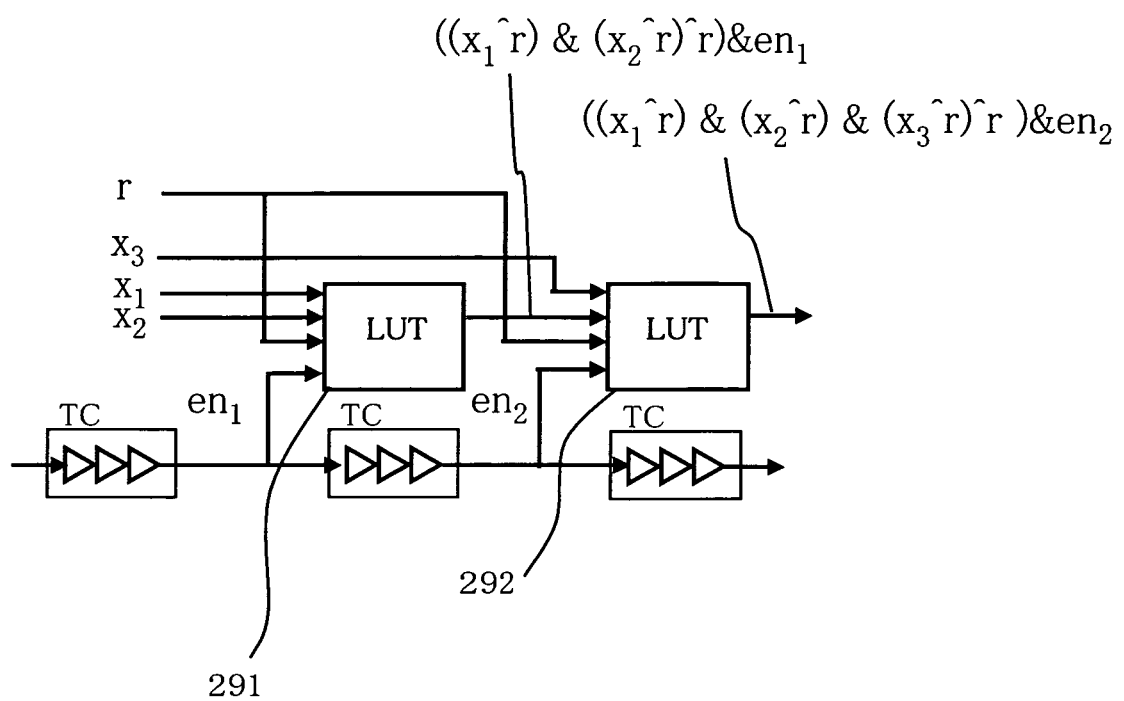
FIG. 16 It is a diagram of a circuit formed by a combination of 2-input elementary devices according to the second embodiment.

With an elementary device having three or more inputs, in general, the size of the LUT is fixed in many cases. Therefore, as shown in FIG. 16, it is practical to use elementary devices having two inputs in combination. In this case, two different control signals are needed. The reason is given. As shown in FIG. 16, there is a time difference in signal change between an input to an LUT 292, which is outputted from an LUT 291, and the other inputs to the LUT 292, which are not outputted from the LUT 291. Therefore, if a control signal is shared, then the randomness of the random number does not work on the previously mentioned grounds (the transient transition of an input signal).

The LUT 200 according to the second embodiment may serve to defend against an attack trying to identify confidential information by power consumption.

The LUT 200 according to the second embodiment may serve to minimize the number of kinds of random numbers to be used based on the process using one kind of the random number r. This may make the area of implementation smaller than that when multiple kinds of random numbers are used.

The LUT 200 according to the second embodiment performs simultaneous switching by the plurality of transistors. This may make the signal transition rate equal without a transient process occurring during an input to an output.

The LUT 200 according to the second embodiment outputs the output z by using the control signal en (a command signal) that instructs the LUT to output it. This may make the signal transition rate equal.

Embodiment 3

A description is given of elementary devices other than the elementary device A 100 of FIG. 6 and the LUT 200 of FIG. 15 with reference to FIG. 17 to FIG. 22. FIG. 17 to FIG. 22 show a series of elementary devices that are also designed to defend against an attack trying to identify confidential information by power consumption, like the elementary device A 100, the LUT 200, etc.

Figure 17:
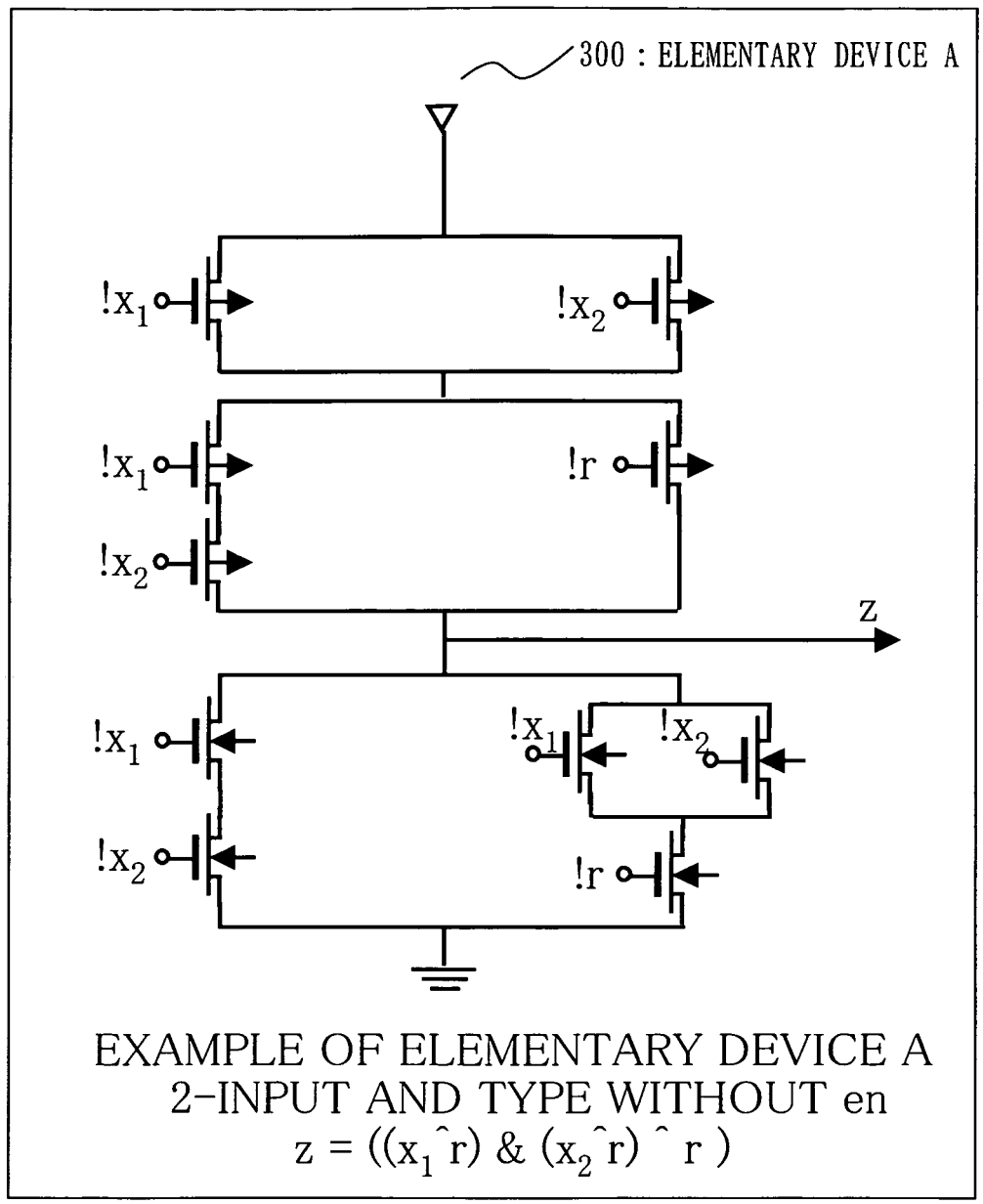
FIG. 17 It is a diagram of an elementary device A 300 according to a third embodiment.

FIG. 17 is a diagram illustrating an elementary device A 300 according to a third embodiment. The elementary device A 300 modifies the elementary device A 100 of FIG. 6 by removing the transistor 101 and the transistor 107 that receive the control signal en. That is, the elementary device A 300 receives input signals $x_1$, $x_2$ and r. The output z is:
$z=((x_1\hat{\ }r)\&(x_2\hat{\ }r)\hat{\ }r)$.
The control signal en does not exist. The elementary device A 300 is designed assuming that the input signals $x_1$, $x_2$ and r are inputted to the respective transistors with the same timing. In other words, the input signals are inputted at the same time, so that corresponding transistors perform switching at the same time. This is done because the control signal en is not needed.

The elementary device A 300 of the third embodiment does not require the input of the control signal en, and therefore may be implemented in a simplified form.

Figure 18:
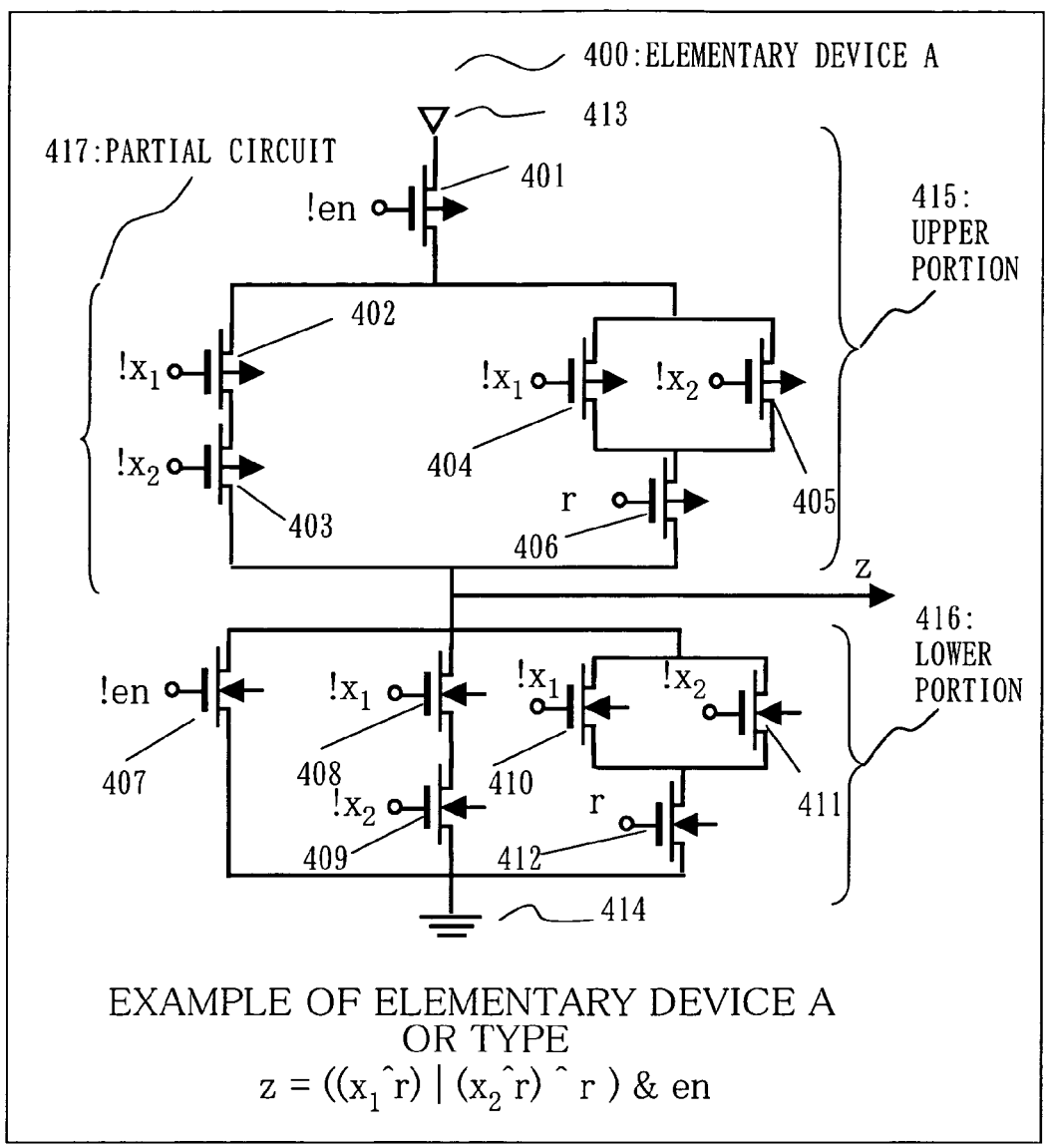
FIG. 18 It is a diagram of an elementary device A 400 according to the third embodiment.

FIG. 18 is a diagram illustrating an elementary device A 400 according to the third embodiment. The elementary device A 400 is a 2-input OR type whereas the elementary device A 100 of FIG. 6 is a 2-input AND type. The elementary device A 400 receives input signals $x_1$, $x_2$ and r. The output z is:
$z=((x_1\hat{\ }r)|(x_2\hat{\ }r)\hat{\ }r)\&en$.
The inputs $x_1$ and $x_2$ are:
$x_1=x_i\hat{\ }r$ and $x_2=x_j\hat{\ }r$, respectively,
like the case of the elementary device A 100. Therefore, an input/output is XORed with a random number. In addition to this, the output z is outputted at once by switching by the respective transistors based on the control signal en. This makes it possible to defend against an attack trying to identify confidential information by power consumption like the elementary device A 100.

(1) A configuration of the elementary device A 400 is explained. The elementary device A 400 is formed by series-connected upper portion 415 and lower portion 416. The output signal z is outputted between the upper portion 415 and the lower portion 416.

(2) With reference to FIG. 18, a sign "!", a right-pointing arrow "→", and a left-pointing arrow "←" denote the same as those of FIG. 6. The same applies to those of FIG. 19 to FIG. 22 discussed later. Voltage corresponding to logic "1" is applied to a voltage applying portion 413.

(3) When the voltage corresponding to logic "1" is applied to the voltage applying portion 413,
$z=((x_1\hat{\ }r)|(x_2\hat{\ }r)\hat{\ }r)\&en$
is outputted by switching of the respective transistors.

(4) The upper portion 415 is formed by series-connected transistor 401 and a partial circuit 417. The transistor 401 is connected to the voltage applying portion 413 at one end and the partial circuit 417 at the other end. The partial circuit 417 is formed by a parallel connection of series-connected transistors 402 and 403 and a series connection of parallel-connected transistors 404 and 405 and a transistor 406.

(5) The lower portion 416 is formed in the same manner as that of the lower portion 116 of the elementary device A 100 of FIG. 6. Specifically, the arrangement of a transistor 407 to a transistor 412 is the same as that of the transistor 107 to the transistor 112. The transistor 412 of the lower portion 416, however, receives the input signal r, which is not inverted, whereas the transistor 112 of the lower portion 116 receives the inverted signal of the input signal r.

(6) Next, the input signal is explained. An inverted signal of the input signal $x_1$ is inputted to the transistor 402, the transistor 404, a transistor 408, and a transistor 410.

(7) An inverted signal of the input signal $x_2$ is inputted to the transistor 403, the transistor 405, a transistor 409, and a transistor 411.

(8) The input signal r is inputted to the transistor 406 and the transistor 412.

(9) An inverted signal of the input signal en is inputted to the transistor 401 and the transistor 407.

Figure 19:
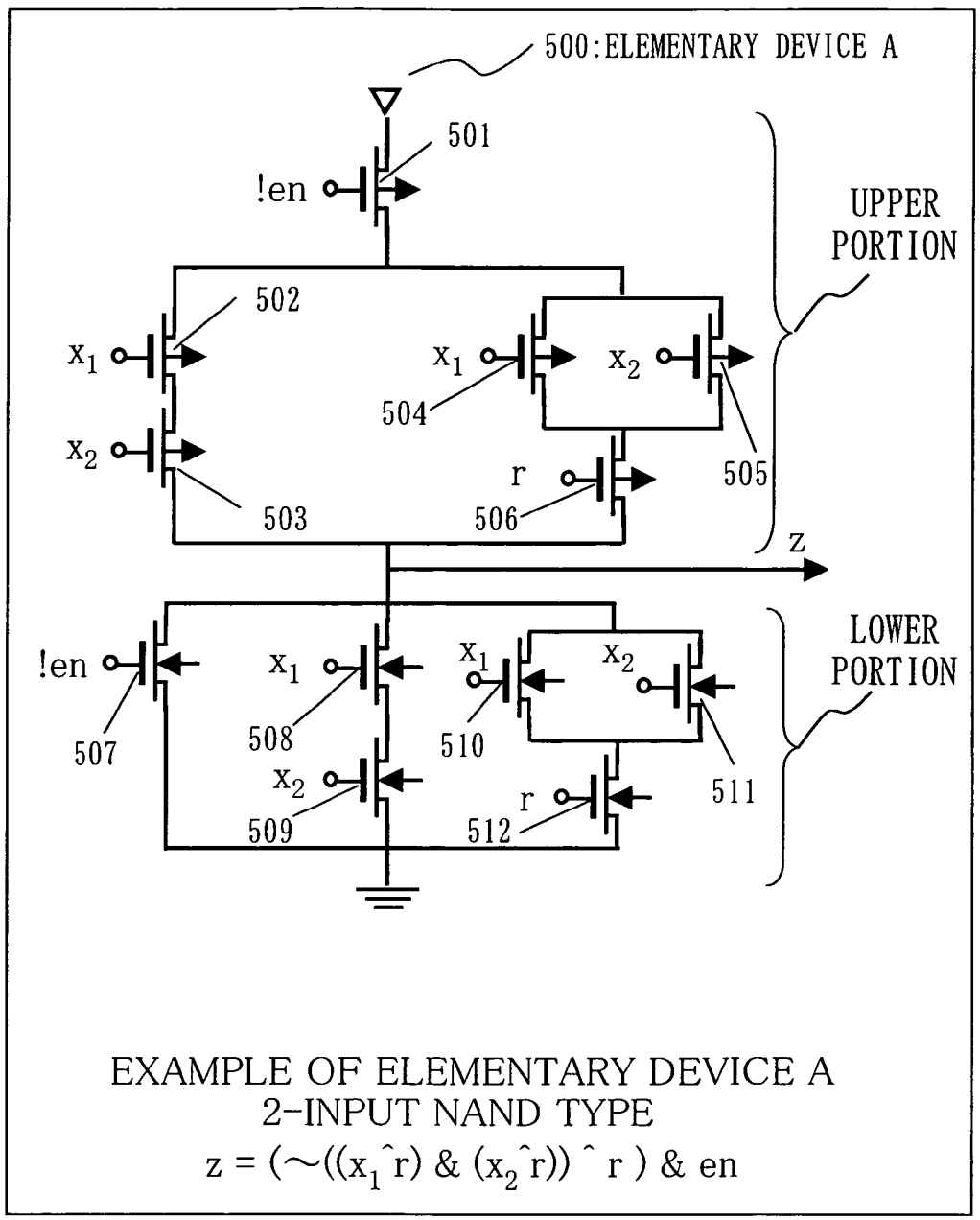
FIG. 19 It is a diagram of an elementary device A 500 according to the third embodiment.

FIG. 19 is a diagram illustrating an elementary device A 500 according to the third embodiment. The elementary device A 500 is a 2-input NAND type whereas the elementary device A 100 of FIG. 6 is a 2-input AND type. The input signals are $x_1$, $x_2$, r and en. The output z is:
$z=(\sim((x_1\hat{\ }r)\&(x_2\hat{\ }r))\hat{\ }r)\&en$.
Inputs $x_1$ and $x_2$ are:
$x_1=x_i\hat{\ }r$ and $x_2=x_j\hat{\ }r$,
respectively. Therefore, an input/output is XORed with a random number. In addition to this, the output z is outputted as soon as possible by switching by the respective transistors based on the control signal en. This makes it possible to defend against an attack trying to identify confidential information by power consumption like the elementary device A 100.

(1) The configuration of the elementary device A 400 is the same as that of the elementary device A 500 of FIG. 18 as shown in FIG. 19, but the signal inversion of input signals to the respective transistors is different.

(2) Input signals are explained. The input signal $x_1$ is inputted to a transistor 502, a transistor 504, a transistor 508, and a transistor 510.

(3) The input signal $x_2$ is inputted to a transistor 503, a transistor 505, a transistor 509, and a transistor 511.

(4) The input signal r is inputted to a transistor 506, and a transistor 512.

(5) An inverted signal of the input signal en is inputted to a transistor 501 and a transistor 507.

Figure 20:
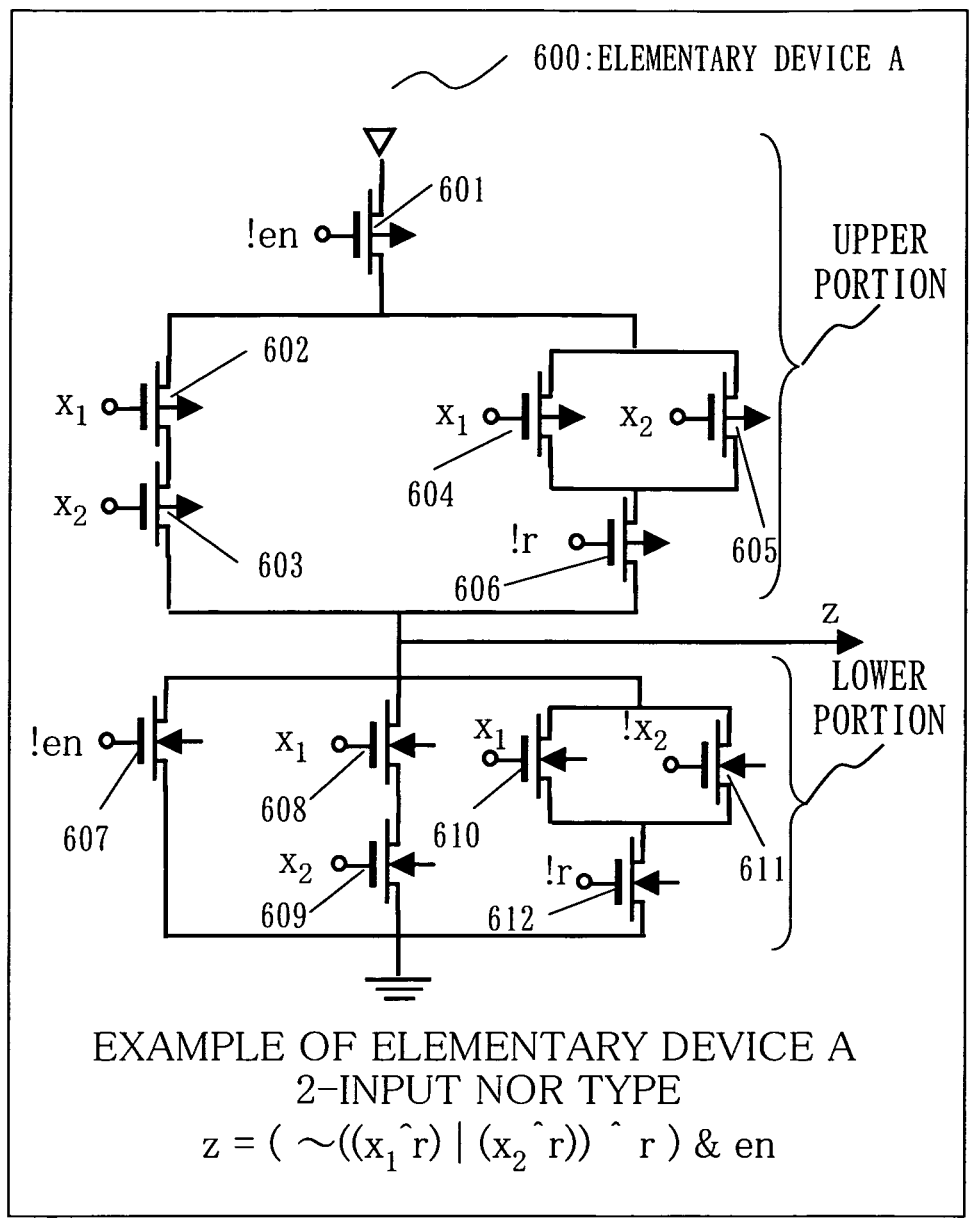
FIG. 20 It is a diagram of an elementary device A 600 according to the third embodiment.

FIG. 20 is a diagram illustrating an elementary device A 600 according to the third embodiment. The elementary device A 600 is a 2-input NOR type whereas the elementary device A 100 of FIG. 6 is a 2-input AND type. The input signals are $x_1$, $x_2$, r and en. The output z is:
"$[z=(\sim((x_1\hat{\ }r)|(x_2\hat{\ }r))\hat{\ }r)\&en]$".
Like the case of the elementary device A 100, the inputs $x_1$ and $x_2$ are:
$x_1=x_i\hat{\ }r$ and $x_2=x_j\hat{\ }r$,
respectively. Therefore, an input/output is XORed with a random number. In addition to this, z is outputted as soon as possible by switching by the respective transistors based on the control signal en. This makes it possible to defend against an attack trying to identify confidential information from power consumption like the elementary device A 100.

(1) The configuration of the elementary device A 600 is the same as that of the elementary device A 100 of FIG. 18 as shown in FIG. 20, but the signal conversion of signals to be inputted to the respective transistors is different.

(2) Input signals are explained. The input signal $x_1$ is inputted to a transistor 602, a transistor 604, a transistor 608, and a transistor 610.

(3) The input signal $x_2$ is inputted to a transistor 603, a transistor 605, and a transistor 609. An inverted signal of the input signal $x_2$ is inputted to a transistor 611.

(4) An inverted signal of the input signal r is inputted to a transistor 606, and a transistor 612.

(5) An inverted signal of the input signal en is inputted to a transistor 601 and a transistor 607.

Figure 21:
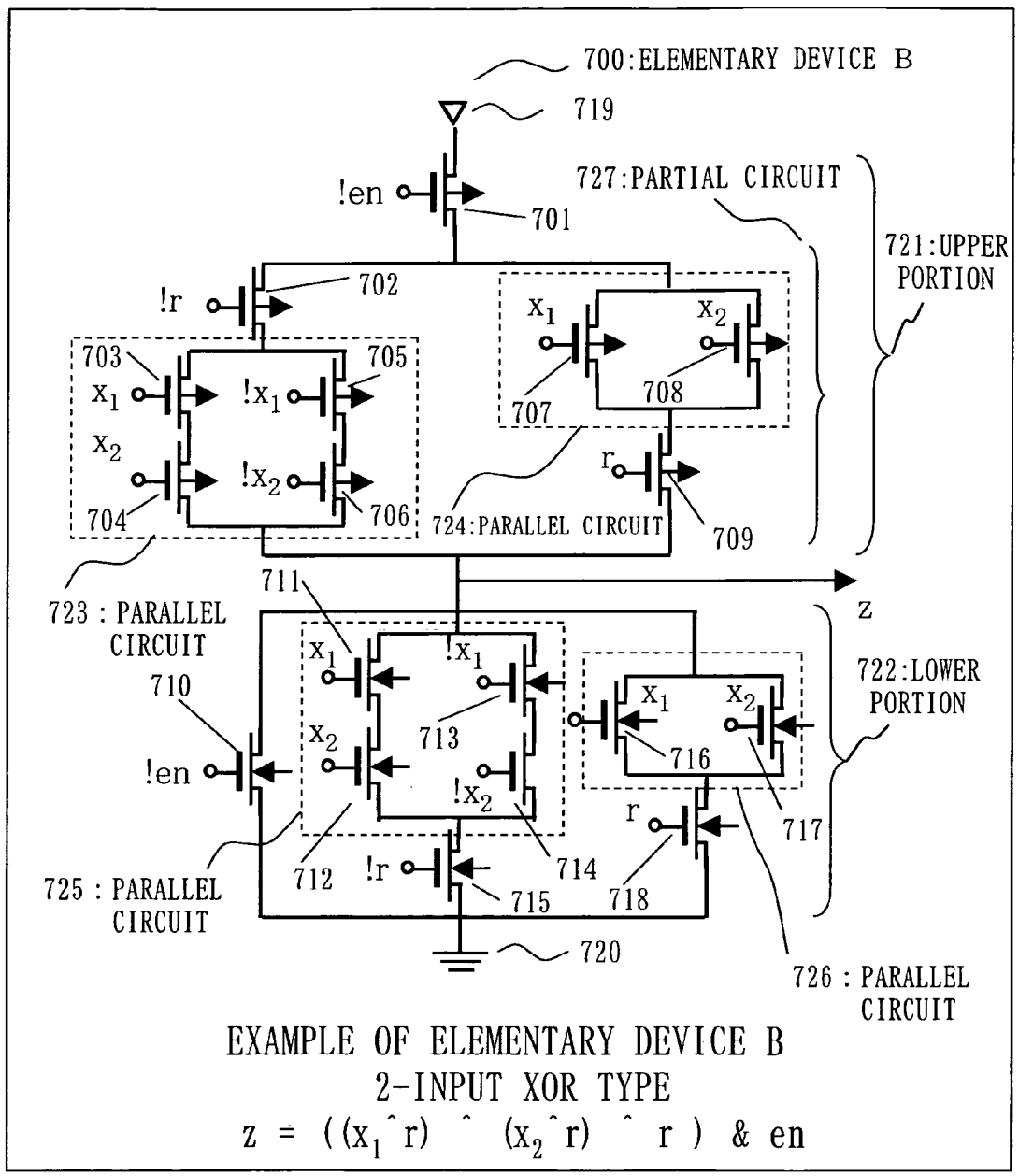
FIG. 21 It is a diagram of an elementary device B 700 according to the third embodiment.

FIG. 21 is a diagram illustrating an elementary device B 700 according to the third embodiment. The elementary device B 700 is a 2-input XOR type whereas the elementary device A 100 of FIG. 6 is a 2-input AND type. The input signals are $x_1$, $x_2$, r and en. The output z is:
$z=((x_1\hat{\ }r)\hat{\ }(x_2\hat{\ }r)\hat{\ }r)\&en$.

Like the case of the elementary device A 100, inputs $x_1$ and $x_2$ are:

$x_1=x_i\hat{\ }r$ and $x_2=x_j\hat{\ }r$, respectively. Therefore, the input/output is XORed with a random number. In addition to this, z is outputted as soon as possible by switching performed by the respective transistors based on the control signal en. This makes it possible to defend against an attack trying to identify confidential information from power consumption like the elementary device A 100.

(1) The elementary device B 700 is formed by series-connected upper portion 721 and lower portion 722. The output signal z is outputted between the upper portion 721 and the lower portion 722.

(2) Voltage corresponding to logic "1" is applied to a voltage applying portion 719.

(3) When voltage corresponding to logic "1" is applied to the voltage applying portion 719, $z=((x_1\hat{\ }r)\hat{\ }(x_2\hat{\ }r)\hat{\ }r)\&en$ is outputted by switching of the respective transistors.

(4) The upper portion 721 is formed by a transistor 701 and a partial circuit 727 connected in series. The transistor 701 is connected to the voltage applying portion 719 at one end and the partial circuit 727 at the other end.

(5) A configuration of the partial circuit 727 is explained. The partial circuit 727 is formed by a parallel connection of series-connected transistor 702 and parallel circuit 723 and series-connected parallel circuit 724 and transistor 709.

More specifically, the parallel circuit 723 is formed by a parallel connection of series-connected transistors 703 and 704 and series-connected transistors 705 and 706.

The parallel circuit 724 is formed by a transistor 705 and a transistor 706.

(6) A configuration of the lower portion 722 is now explained. The lower portion 722 is formed by a parallel connection of a transistor 710, series-connected parallel circuit 725 and transistor 715, and series-connected parallel circuit 726 and transistor 718. More specifically, the parallel circuit 725, like the parallel circuit 723, is formed by a parallel connection of series-connected transistors 711 and 712 and series-connected transistors 713 and 714. The parallel circuit 726 is formed by a transistor 716 and a transistor 717.

(7) Next, input signals to the respective transistors are explained. The input signal $x_1$ is inputted to the transistor 703, the transistor 707, the transistor 711, and the transistor 716. An inverted signal of the input signal $x_1$ is inputted to the transistor 705, and the transistor 713. The input signal $x_2$ is inputted to the transistor 704, the transistor 708, the transistor 712, and the transistor 717. An inverted signal of the input signal $x_2$ is inputted to the transistor 706, and the transistor 714. The input signal r is inputted to the transistor 709 and the transistor 718. An inverted signal of the input signal r is inputted to the transistor 702 and the transistor 715. An inverted signal of the input signal en is inputted to the transistor 701 and the transistor 710.

Figure 22:
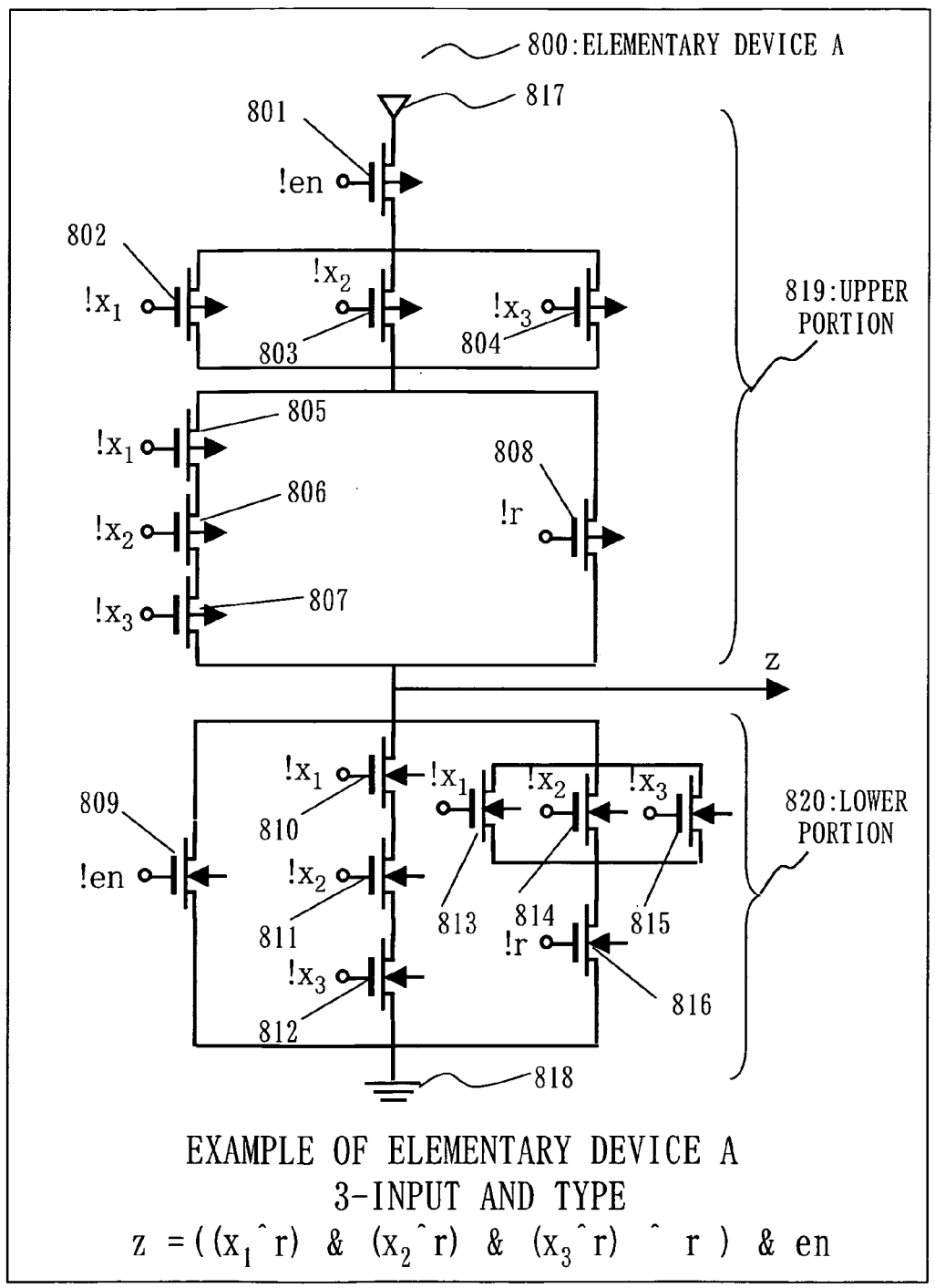
FIG. 22 It is a diagram of an elementary device A 800 according to the third embodiment.

FIG. 22 is a diagram illustrating an elementary device A 800 according to the third embodiment. The elementary device A 800 is a 3-input AND type whereas the elementary device A 100 of FIG. 6 is a 2-input AND type. The input signals are $x_1$, $x_2$, $x_3$, r and en. The output z is:

$z=((x_1\hat{\ }r)\&(x_2\hat{\ }r)\&(x_3\hat{\ }r)\hat{\ }r)\&en$.

Like the case of the elementary device A 100, inputs $x_1$, $x_2$ and $x_3$ are:

$x_1=x_i\hat{\ }r$, $x_2=x_j\hat{\ }r$, and $x_3=x_k\hat{\ }r$, respectively. Therefore, an input/output is XORed with a random number. In addition to this, z is outputted as soon as possible by switching performed by the respective transistors based on the control signal en. This makes it possible to defend against an attack trying to identify confidential information from power consumption like the elementary device A 100.

(1) The elementary device A 800 is formed by an upper portion 819 and a lower portion 820 connected in series. The output signal z is outputted between the upper portion 819 and the lower portion 820.

(2) Voltage corresponding to logic "1" is applied to a voltage applying portion 817.

(3) When voltage corresponding to logic "1" is applied to the voltage applying portion 817:

$[z=((x_1\hat{\ }r)\&(x_2\hat{\ }r)\&(x_3\hat{\ }r)\hat{\ }r)\&en]$ is outputted by switching of the respective transistors.

(4) The upper portion 819 is formed by a series connection of a transistor 801, a partial circuit of a transistor 802, a transistor 803, and a transistor 804, and a parallel circuit of series-connected transistors 805, 806 and 807 and a transistor 808.

(5) The lower portion 820 is formed by a parallel circuit of a transistor 809, series-connected transistors 810, 811 and 812, and series-connected parallel circuit of transistors 813, 814 and 815 and a transistor 816.

(6) Input signals to the respective transistors are now explained. With the elementary device A 800, all the input signals $x_1$, $x_2$, $x_3$, r and en are inverted and then inputted to the respective transistors. An inverted signal of the input signal $x_1$ is inputted to the transistor 802, the transistor 805, the transistor 810, and the transistor 813. An inverted signal of the input signal $x_2$ is inputted to the transistor 803, the transistor 806, the transistor 811 and the transistor 814. An inverted signal of the input signal $x_3$ is inputted to the transistor 804, the transistor 807, the transistor 812, and the transistor 815. An inverted signal of the input signal r is inputted to the transistor 808 and the transistor 816. An inverted signal of the input signal en is inputted to the transistor 801 and the transistor 809.

Figure 23:
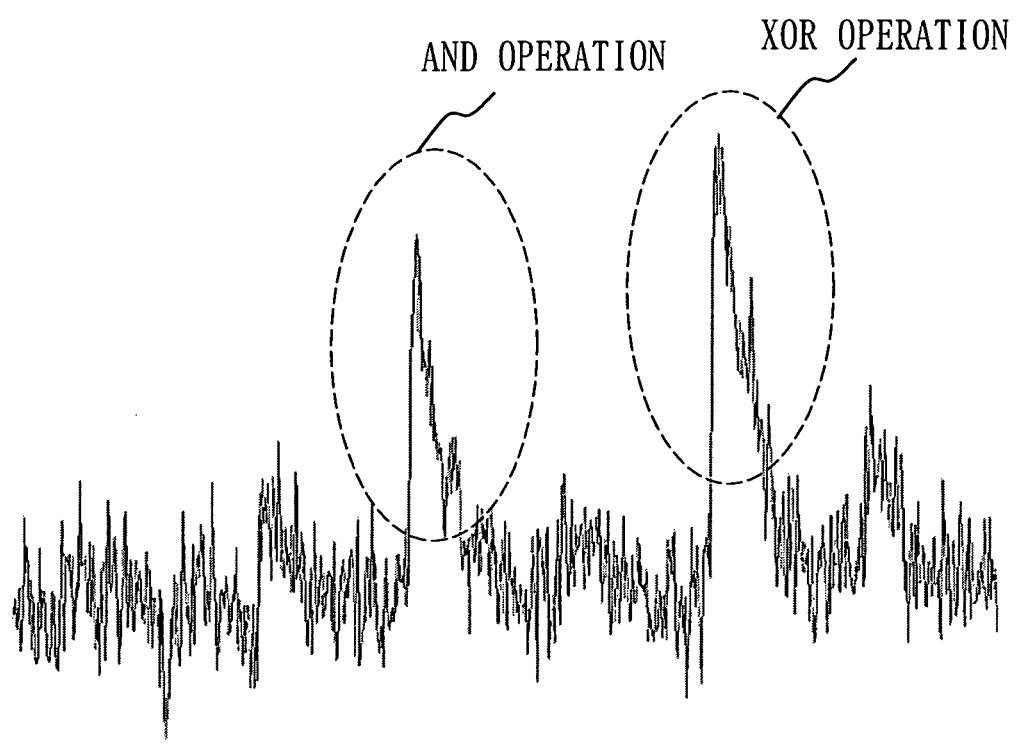
FIG. 23 It is a graph of time-varying power consumption before countermeasures are taken against an attack trying to identify confidential information by power consumption.

FIG. 23 is a graph showing time variation of power consumption when an attack is made to identify confidential information from power consumption. FIG. 23 shows the time variation of power consumption sampled prior to countermeasures being taken for a circuit formed by AND circuits and XOR circuits without using the elementary device A or the elementary device B. As the figure shows, peaks appear in consumed energy when an AND operation and an XOR operation are executed. The presence of the peak may identify confidential information.

Figure 24:
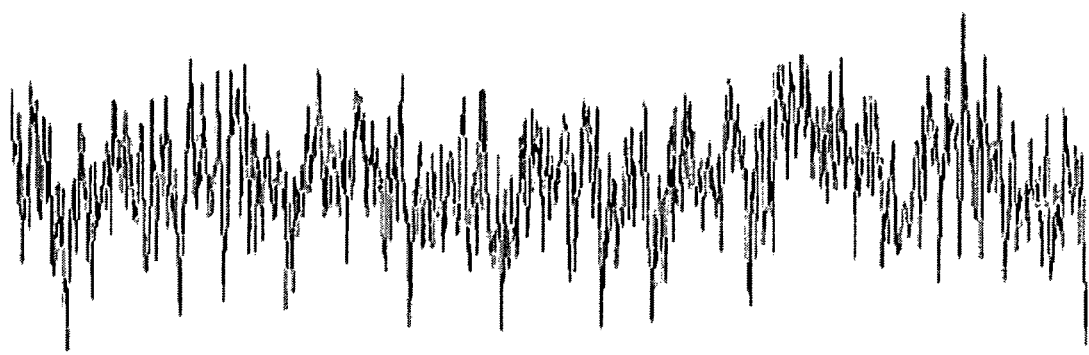
FIG. 24 It is a graph of time-varying power consumption after countermeasures are taken against an attack trying to identify confidential information by power consumption.

FIG. 24 is a comparative example to FIG. 23 showing a result of countermeasures being taken with the elementary device A or the elementary device B. No such peak as those in FIG. 23 appears. The absence of the peak may prevent confidential information from being identified.

EXPLANATION OF REFERENCE NUMERALS

1 input data X, 2 selector, 3 random number generator, 4,5 exclusive OR, 6 nonlinear transformation $S_1$, 7 linear transformation $L_2$, 8 control circuit, 9 timing generating circuit TG, 10 timing control circuit TC, 11 AND gate, 12 exclusive OR, 13,14 register, 20 device, 21,22 XOR, 23,24 AND gate, 25 output point, 26 control signal en, 27 XOR, 30 circuit, 31 circuit, 40 AND gate, 100 elementary device A, 101-112 transistor, 113 voltage applying portion, 114 earth, 115 upper portion, 116 lower portion, 200 LUT, 201-230 branch, 250 input portion, 260 SRAM, 270 data stream, 280 pass-transistor, 291,292 LUT, 300 elementary device A, 400 elementary device A, 401-412 transistor, 413 voltage applying portion, 414 earth, 415 upper portion, 416 lower portion, 417 partial circuit, 500 elementary device A, 501-512 transistor, 600 elementary device A, 601-612 transistor, 700 elementary device B, 701-718 transistor, 719 voltage applying portion, 720 earth, 721 upper portion, 722 lower portion, 723 parallel circuit, 724,725,726 parallel circuit, 727 partial circuit, 800 elementary device A, 801-816 transistor, 817 voltage applying portion, 818 earth, 819 upper portion, 820 lower portion.

The invention claimed is:

1. A circuit that processes cryptographic algorithms, where the cryptographic algorithm is a combination of nonlinear and linear transforms to ensure security, the circuit comprising:
- at least one electronic device that forms the nonlinear transforms;
- at least one electronic device that forms a linear transformation;
- a random number generator, and
- a control that outputs timing control signals for the electronic devices,
- wherein the electronic device that forms the nonlinear transformation receives XOR data indicating data obtained by XORing data of n bits (n≥1) with a first random number of n bits, the first random number of n bits, and a second random number of 1 bit as input signals, performs an XOR operation of the XOR data with the first random number to obtain the data of n bits, performs a predetermined logic operation using each bit of the data of n bits obtained, performs an XOR operation of a result of the logic operation with the second random number, outputs as an output signal a result of the XOR operation of the result of the logic operation with the second random number, receives the timing control signal that instructs the electronic device to output the output signal, and outputs the output signal upon receipt of a leading edge of the timing control signal, where the leading edge of the timing control signal is generated after state transitions of the other input signals to the electronic device are fully completed.

2. The circuit of claim 1, wherein the first random number is a n-bit random number, each bit having a same value, and wherein the second random number is the same value as that of the each bit of the first random number.

3. The circuit of claim 1, wherein the predetermined logic operation is selected from among a logical multiply (AND) operation, a negative AND (NAND) operation, a logical add (OR) operation, a negative OR (NOR) operation, and an exclusive-OR (XOR) operation.

* * * * *